US012222723B2

United States Patent
Yamauchi

(10) Patent No.: US 12,222,723 B2
(45) Date of Patent: Feb. 11, 2025

(54) DIRECTED EXPLORATION FOR NAVIGATION IN DYNAMIC ENVIRONMENTS

(71) Applicant: Boston Dynamics, Inc., Waltham, MA (US)

(72) Inventor: Brian Masao Yamauchi, Boston, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

(21) Appl. No.: 17/805,135

(22) Filed: Jun. 2, 2022

(65) Prior Publication Data

US 2022/0390950 A1 Dec. 8, 2022

Related U.S. Application Data

(60) Provisional application No. 63/202,289, filed on Jun. 4, 2021.

(51) Int. Cl.
*G05D 1/00* (2024.01)
*G01C 21/00* (2006.01)

(52) U.S. Cl.
CPC ....... *G05D 1/0214* (2013.01); *G01C 21/3826* (2020.08); *G05D 1/0274* (2013.01)

(58) Field of Classification Search
CPC ................ G05D 1/0214; G05D 1/027; G05D 2201/0217; G05D 1/0248; G01C 21/3826; G01C 21/3415

(Continued)

(56) References Cited

U.S. PATENT DOCUMENTS

| 5,111,401 A | 5/1992 | Everett et al. |
| 5,378,969 A | 1/1995 | Haikawa |

(Continued)

FOREIGN PATENT DOCUMENTS

| CA | 2928262 | 7/2012 |
| CN | 102037317 A | 4/2011 |

(Continued)

OTHER PUBLICATIONS

Kuipers et al. "A Robot Exploration and Mapping Strategy Based on a Semantic Hierarchy of Spatial Representations" Journal of Robotics & Autonomous Systems vol. 8, 1991, pp. 47-63.

(Continued)

*Primary Examiner* — Tuan C To
*Assistant Examiner* — Dominick Mulder
(74) *Attorney, Agent, or Firm* — Knobbe, Martens, Olson & Bear, LLP

(57) ABSTRACT

A computer-implemented method when executed by data processing hardware causes the data processing hardware to perform operations. The operations include receiving a navigation route for a mobile robot. The navigation route includes a sequence of waypoints connected by edges. Each edge corresponds to movement instructions that navigate the mobile robot between waypoints of the sequence of waypoints. While the mobile robot is traveling along the navigation route, the operations include determining that the mobile robot is unable to execute a respective movement instruction for a respective edge of the navigation route due to an obstacle obstructing the respective edge, generating an alternative path to navigate the mobile robot to an untraveled waypoint in the sequence of waypoints, and resuming travel by the mobile robot along the navigation route. The alternative path avoids the obstacle.

26 Claims, 10 Drawing Sheets

(58) Field of Classification Search
USPC .................................................... 701/26
See application file for complete search history.

(56) References Cited

U.S. PATENT DOCUMENTS

| | | | |
|---|---|---|---|
| 7,211,980 B1* | 5/2007 | Bruemmer | G05D 1/0274 |
| | | | 318/587 |
| 7,865,267 B2 | 1/2011 | Sabe et al. | |
| 7,912,583 B2 | 3/2011 | Gutmann et al. | |
| 8,270,730 B2 | 9/2012 | Watson | |
| 8,346,391 B1 | 1/2013 | Anhalt et al. | |
| 8,401,783 B2 | 3/2013 | Hyung et al. | |
| 8,548,734 B2 | 10/2013 | Barbeau et al. | |
| 8,849,494 B1 | 9/2014 | Herbach et al. | |
| 8,930,058 B1 | 1/2015 | Quist et al. | |
| 9,352,470 B1 | 5/2016 | da Silva et al. | |
| 9,561,592 B1 | 2/2017 | Silva et al. | |
| 9,574,883 B2 | 2/2017 | Watts et al. | |
| 9,586,316 B1 | 3/2017 | Swilling | |
| 9,594,377 B1 | 3/2017 | Perkins et al. | |
| 9,717,387 B1 | 8/2017 | Szatmary et al. | |
| 9,844,879 B1 | 12/2017 | Cousins et al. | |
| 9,896,091 B1* | 2/2018 | Kurt | G08G 1/144 |
| 9,908,240 B1 | 3/2018 | da Silva et al. | |
| 9,933,781 B1 | 4/2018 | Bando et al. | |
| 9,969,086 B1 | 5/2018 | Whitman | |
| 9,975,245 B1 | 5/2018 | Whitman | |
| 10,081,098 B1 | 9/2018 | Nelson et al. | |
| 10,081,104 B1 | 9/2018 | Swilling | |
| 10,226,870 B1 | 3/2019 | Silva et al. | |
| 10,639,794 B2 | 5/2020 | Cousins et al. | |
| 11,175,664 B1* | 11/2021 | Boyraz | G05D 1/0274 |
| 11,268,816 B2 | 3/2022 | Fay et al. | |
| 11,287,826 B2 | 3/2022 | Whitman et al. | |
| 11,416,003 B2 | 8/2022 | Whitman et al. | |
| 11,480,974 B2* | 10/2022 | Lee | G06T 17/05 |
| 11,518,029 B2* | 12/2022 | Cantor | B25J 9/1664 |
| 11,656,630 B2 | 5/2023 | Jonak et al. | |
| 11,747,825 B2 | 9/2023 | Jonak et al. | |
| 11,774,247 B2 | 10/2023 | Fay et al. | |
| 2005/0131581 A1 | 6/2005 | Sabe et al. | |
| 2006/0009876 A1* | 1/2006 | McNeil | G05D 1/0272 |
| | | | 700/245 |
| 2006/0025888 A1 | 2/2006 | Gutmann et al. | |
| 2006/0167621 A1 | 7/2006 | Dale | |
| 2007/0233338 A1* | 10/2007 | Ariyur | G05D 1/0289 |
| | | | 701/23 |
| 2007/0282564 A1 | 12/2007 | Sprague et al. | |
| 2008/0009966 A1* | 1/2008 | Bruemmer | G05D 1/0274 |
| | | | 700/245 |
| 2008/0027590 A1 | 1/2008 | Phillips et al. | |
| 2008/0086241 A1 | 4/2008 | Phillips et al. | |
| 2009/0125225 A1 | 5/2009 | Hussain et al. | |
| 2010/0066587 A1 | 3/2010 | Yamauchi et al. | |
| 2010/0172571 A1 | 7/2010 | Yoon et al. | |
| 2011/0035087 A1* | 2/2011 | Kim | G05D 1/0274 |
| | | | 701/25 |
| 2011/0172850 A1 | 7/2011 | Paz-Meidan et al. | |
| 2011/0224901 A1 | 9/2011 | Aben et al. | |
| 2012/0089295 A1 | 4/2012 | Ahn et al. | |
| 2012/0182392 A1 | 7/2012 | Kearns et al. | |
| 2012/0323432 A1 | 12/2012 | Wong et al. | |
| 2013/0141247 A1 | 6/2013 | Ricci | |
| 2013/0231779 A1 | 9/2013 | Purkayastha et al. | |
| 2013/0325244 A1 | 12/2013 | Wang et al. | |
| 2014/0188325 A1 | 7/2014 | Johnson et al. | |
| 2015/0158182 A1 | 6/2015 | Farlow et al. | |
| 2015/0355638 A1 | 12/2015 | Field et al. | |
| 2016/0375901 A1* | 12/2016 | Di Cairano | G01C 21/3453 |
| | | | 701/26 |
| 2017/0017236 A1* | 1/2017 | Song | G05D 1/0274 |
| 2017/0095383 A1* | 4/2017 | Li | A61G 5/04 |
| 2017/0120448 A1* | 5/2017 | Lee | G05D 1/0214 |
| 2017/0131102 A1 | 5/2017 | Wirbel et al. | |
| 2017/0203446 A1 | 7/2017 | Dooley et al. | |
| 2018/0051991 A1 | 2/2018 | Hong | |
| 2018/0161986 A1 | 6/2018 | Kee et al. | |
| 2018/0173242 A1 | 6/2018 | Lalonde et al. | |
| 2018/0328737 A1 | 11/2018 | Frey et al. | |
| 2018/0348742 A1 | 12/2018 | Byme et al. | |
| 2019/0056743 A1* | 2/2019 | Alesiani | G05D 1/0217 |
| 2019/0079523 A1 | 3/2019 | Zhu et al. | |
| 2019/0080463 A1 | 3/2019 | Davison et al. | |
| 2019/0138029 A1 | 5/2019 | Ryll et al. | |
| 2019/0171911 A1 | 6/2019 | Greenberg | |
| 2019/0187699 A1* | 6/2019 | Salour | G05D 1/024 |
| 2019/0187703 A1 | 6/2019 | Millard et al. | |
| 2019/0213896 A1 | 7/2019 | Gohi et al. | |
| 2019/0318277 A1 | 10/2019 | Goldman et al. | |
| 2019/0332114 A1 | 10/2019 | Moroniti et al. | |
| 2020/0109954 A1 | 4/2020 | Li et al. | |
| 2020/0117198 A1 | 4/2020 | Whitman et al. | |
| 2020/0117214 A1 | 4/2020 | Jonak et al. | |
| 2020/0164521 A1 | 5/2020 | Li | |
| 2020/0174460 A1 | 6/2020 | Byme et al. | |
| 2020/0192388 A1* | 6/2020 | Zhang | G05D 1/027 |
| 2020/0198140 A1* | 6/2020 | Dupuis | G01C 21/20 |
| 2020/0249033 A1 | 8/2020 | Gelhar | |
| 2020/0258400 A1 | 8/2020 | Yuan et al. | |
| 2020/0333790 A1 | 10/2020 | Kobayashi et al. | |
| 2020/0386882 A1 | 12/2020 | Klein et al. | |
| 2020/0409382 A1 | 12/2020 | Herman et al. | |
| 2021/0041243 A1 | 2/2021 | Fay et al. | |
| 2021/0041887 A1 | 2/2021 | Whitman et al. | |
| 2021/0064055 A1 | 3/2021 | Jun | |
| 2021/0141389 A1 | 5/2021 | Jonak et al. | |
| 2021/0180961 A1 | 6/2021 | Oh | |
| 2021/0311480 A1 | 10/2021 | Yang et al. | |
| 2021/0323618 A1 | 10/2021 | Komoroski | |
| 2021/0382491 A1* | 12/2021 | Murotani | G05D 1/0217 |
| 2022/0024034 A1* | 1/2022 | Wei | G05D 1/0251 |
| 2022/0063662 A1 | 3/2022 | Sprunk et al. | |
| 2022/0083062 A1* | 3/2022 | Jaquez | G05D 1/0297 |
| 2022/0137637 A1* | 5/2022 | Baldini | G01C 21/3446 |
| | | | 701/25 |
| 2022/0155078 A1 | 5/2022 | Fay et al. | |
| 2022/0179420 A1 | 6/2022 | Whitman et al. | |
| 2022/0244741 A1 | 8/2022 | Silva et al. | |
| 2022/0276654 A1* | 9/2022 | Lee | G05D 1/0274 |
| 2022/0342421 A1* | 10/2022 | Kearns | G05D 1/0214 |
| 2022/0374024 A1 | 11/2022 | Whitman et al. | |
| 2022/0388170 A1 | 12/2022 | Merewether | |
| 2022/0390950 A1 | 12/2022 | Yamauchi | |
| 2022/0390954 A1 | 12/2022 | Klingensmith | |
| 2023/0309776 A1* | 10/2023 | Li | G05D 1/0219 |
| | | | 15/319 |
| 2023/0359220 A1 | 11/2023 | Jonak et al. | |
| 2023/0400307 A1 | 12/2023 | Fay et al. | |
| 2023/0418297 A1 | 12/2023 | Komoroski et al. | |
| 2024/0061436 A1* | 2/2024 | Tsuzaki | B62D 57/02 |
| 2024/0165821 A1* | 5/2024 | Dabiri | G05D 1/0219 |

FOREIGN PATENT DOCUMENTS

| | | |
|---|---|---|
| CN | 203371557 | 1/2014 |
| CN | 104075715 A | 10/2014 |
| CN | 104470685 A | 3/2015 |
| CN | 104536445 A | 4/2015 |
| CN | 106371445 A | 2/2017 |
| CN | 107301654 A | 10/2017 |
| CN | 107943038 A | 4/2018 |
| CN | 108052103 | 5/2018 |
| CN | 108801269 A | 11/2018 |
| CN | 109029417 A | 12/2018 |
| CN | 109540142 A | 3/2019 |
| CN | 111604916 | 9/2020 |
| CN | 211956515 | 11/2020 |
| CN | 112034861 | 12/2020 |
| CN | 113168184 | 7/2021 |
| CN | 113633219 | 11/2021 |
| CN | 114174766 | 3/2022 |
| CN | 114503043 | 5/2022 |
| JP | H 02127180 | 5/1990 |
| JP | H09-134217 | 11/2003 |

(56) References Cited

FOREIGN PATENT DOCUMENTS

| | | |
|---|---|---|
| JP | 2005-088189 | 4/2005 |
| JP | 2006-011880 | 1/2006 |
| JP | 2006-239844 | 9/2006 |
| JP | 2007-041656 | 2/2007 |
| JP | 2008-072963 | 4/2008 |
| JP | 2009-223628 | 10/2009 |
| JP | 2009-271513 | 11/2009 |
| JP | 2010-253585 | 11/2010 |
| JP | 2013-250795 | 12/2013 |
| JP | 2014-123200 | 7/2014 |
| JP | 2014-151370 | 8/2014 |
| JP | 2014151370 A | 8/2014 |
| JP | 2016-081404 | 5/2016 |
| JP | 2016-103158 | 6/2016 |
| JP | 2017-182502 | 10/2017 |
| JP | 2019500691 A | 1/2019 |
| JP | 2019-021197 | 2/2019 |
| JP | 2022-504039 | 1/2022 |
| JP | 2022-543997 | 10/2022 |
| JP | 7219812 | 2/2023 |
| JP | 7259020 | 4/2023 |
| KR | 10-1121763 | 3/2012 |
| KR | 20120019893 | 3/2012 |
| KR | 20130020107 A | 2/2013 |
| KR | 10-2022-0078563 | 6/2022 |
| KR | 20220083666 | 6/2022 |
| KR | 10-2504729 | 2/2023 |
| KR | 10-2023-0035139 | 3/2023 |
| KR | 10-2533690 | 5/2023 |
| KR | 10-2492242 | 6/2023 |
| WO | WO 2007/051972 | 5/2007 |
| WO | WO2017/090108 | 6/2017 |
| WO | WO 2018/231616 | 12/2018 |
| WO | WO 2020/076418 | 4/2020 |
| WO | WO 2020/076422 | 4/2020 |
| WO | WO 2021/025707 | 2/2021 |
| WO | WO 2021/025708 | 2/2021 |
| WO | WO 2022/164832 | 8/2022 |
| WO | WO 2022/256811 | 12/2022 |
| WO | WO 2022/256815 | 12/2022 |
| WO | WO 2022/256821 | 12/2022 |
| WO | WO 2023/249979 A1 | 12/2023 |

OTHER PUBLICATIONS

Yamauchci et al. "Place Recognition in Dynamic Environments" Journal of Robotic Systems, Special Issue on Mobile Robots, vol. 14, No. 2, Feb. 1997, pp. 107-120.

Yamauchi et al. "Spatial Learning for Navigation in Dynamic Environments" IEEE Transactions on Systems, Man, and Cybernetics—Part B: Cybernetics, Special Issue on Learning Autonomous Robots, vol. 26, No. 3, Jun. 1996, pp. 496-505.

Abraham et al., "A Topological Approach of Path Planning for Autonomous Robot Navigation in Dynamic Environments", The 2009 IEEE/RSJ International Conference on Intelligent Robots and Systems, Oct. 11-15, 2009, DOI: 10.1109/IROS.2009.5354771, pp. 4907-4912.

Alkautsar, "Topological Path Planning and Metric Path Planning", https://medium.com/@arifmaulanaa/topological-path-planning-and-metric-path-planning-5c0fa7f107f2, downloaded Feb. 13, 2023, 3 pages.

boost.org, "buffer (with strategies)", https://www.boost.org/doc/libs/1_75_0/libs/geometry/doc/html/geometry/reference/algorithms/buffer/buffer_7_with_strategies.html, downloaded Feb. 1, 2023, 5 pages.

Buchegger et al. "An Autonomous Vehicle for Parcel Delivery in Urban Areas" 2018 21st International Conference on Intelligent Transportation Systems (ITSC), Nov. 2018, DOI: 10.1109/ITSC.2018.8569339, pp. 2961-2967.

Cao, "Topological Path Planning for Crowd Navigation", https://www.ri.cmu.edu/app/uploads/2019/05/thesis.pdf, May 2019, 24 pages.

Collins et al. "Efficient Planning for High-Speed MAV Flight in Unknown Environments Using Online Sparse Topological Graphs" IEEE International Conference on Robotics and Automation (ICRA), Aug. 2020, DOI: 10.1109/ICRA40945.2020.9197167, pp. 11450-11456.

github.com, "cartographer-project/cartographer", https://github.com/cartographer-project/cartographer, downloaded Feb. 1, 2023, 4 pages.

International Search Report and Written Opinion for PCT Application No. PCT/US2019/047804 mailed Apr. 6, 2020 in 14 pages.

International Search Report and Written Opinion for PCT Application No. PCT/US2019/051092, Apr. 30, 2020, 12 pages.

International Search Report and Written Opinion for PCT Application No. PCT/US2022/072710 Sep. 27, 2022, 16 pages.

International Search Report and Written Opinion for PCT Application No. PCT/US2022/072703, Sep. 22, 2022, 13 pages.

International Search Report and Written Opinion for PCT Application No. PCT/US2022/072717, Sep. 30, 2022, 26 pages.

Mccammon et al., "Topological path planning for autonomous information gathering", Auton. Robot 45, (2021), https://doi.org/10.1007/s10514-021-10012-x, pp. 821-842.

Leon et al., "TIGRE: Topological Graph based Robotic Exploration", 2017 European Conference on Mobile Robots (ECMR), Paris, France, 2017, doi: 10.1109/ECMR.2017.8098718. pp. 1-6.

Mendes et al., "ICP-based pose-graph SLAM", International Symposium on Safety, Security and Rescue Robotics (SSRR), Oct. 2016, Lausanne, Switzerland, ff10.1109/SSRR.2016.7784298, hal-01522248, pp. 195-200.

Poncela et al., "Efficient integration of metric and topological maps for directed exploration of unknown environments", Robotics and Autonomous Systems, vol. 41, No. 1, Oct. 31, 2002, https://doi.org/10.1016/S0921-8890(02)00272-5, p. 21-39.

Tang, "Introduction to Robotics", The Wayback Machine, https://web.archive.org/web/20160520085742/http://www.cpp.edu:80/~ftang/courses/CS521/, downloaded Feb. 3, 2023, 58 pages.

Thrun et al, "The GraphSLAM Algorithm with Applications to Large-Scale Mapping of Urban Structures", The International Journal of Robotics Research, vol. 25, No. 5-6, May-Jun. 2006, DOI:10.1177/0278364906065387, pp. 403-4290.

Video game, "Unreal Engine 5", https://docs.unrealengine.com/5.0/en-US/basic-navigation-in-unreal-engine/, downloaded Feb. 1, 2023, 15 pages.

Whelan et al, "ElasticFusion: Dense SLAM Without a Pose Graph", http://www.roboticsproceedings.org/rss11/p01.pdf, downloaded Feb. 1, 2023, 9 pages.

wilipedia.org, "Buffer (GIS)", http://wiki.gis.com/wiki/index.php/Buffer_(GIS)#:~:text=A%20'polygon%20buffer'%20is%20a,Buffer%20around%20line%20features, downloaded Feb. 1, 2023, 4 pages.

wikipedia.org, "Probabilistic roadmap", https://en.wikipedia.org/wiki/Probabilistic_roadmap, downloaded Feb. 1, 2023, 2 pages.

wikipedia.org, "Rapidly-exploring random tree", https://en.wikipedia.org/wiki/Rapidly-exploring_random_tree, downloaded Feb. 1, 2023, 7 pages.

wikipedia.org, "Visibility graph", https://en.wikipedia.org/wiki/Visibility_graph, downloaded Feb. 1, 2023, 3 pages.

Boston Dynamics, "Hey Buddy, Can You Give Me a Hand?," https://www.youtube.com/watch?v=fUyU3IKzoio, Feb. 12, 2018, downloaded Jul. 31, 2023.

Boston Dynamics, "Introducing Spot Classic (previously Spot)," https://www.youtube.com/watch?v=M8YjvHYbZ9w, Feb. 9, 2015, downloaded Aug. 10, 2023.

Boston Dynamics, "Introducing Spot (Previously SpotMini)," https://www.youtube.com/watch?v=tf7IEVTDjng, Jun. 23, 2016, downloaded Jul. 31, 2023.

Boston Dynamics, "Spot Autonomous Navigation," https://www.youtube.com/watch?v=Ve9kWX_KXus, May 10, 2018, downloaded Sep. 5, 2023.

Boston Dynamics, "Spot Robot Testing at Construction Sites," https://www.youtube.com/watch?v=wND9goxDVrY&t=15s, Oct. 11, 2018, downloaded Sep. 5, 2023.

Boston Dynamics, "SpotMini," The Wayback Machine, http://web.archive.org/web/20171118145237/https://bostondynamics.com/spot-mini, downloaded Jul. 31, 2023, 3 pages.

Boston Dynamics, "Testing Robustness," https://www.youtube.com/watch?v=aFuA50H9uek, Feb. 20, 2018, downloaded Jul. 31, 2023.

(56) References Cited

OTHER PUBLICATIONS

Boston Dynamics, "The New Spot," https://www.youtube.com/watch?v=kgaO45SyaO4, Nov. 13, 2017, downloaded Jul. 31, 2023.
International Search Report and Written Opinion received in PCT Application No. PCT/US2019/046646 dated Oct. 31, 2019, 9 pages.
International Search Report and Written Opinion received in International Application No. PCT/US2019/051511, Jul. 1, 2020, 15 pages.
International Search Report and Written Opinion, PCT/US2022/013777, May 6, 2022, 16 pages.
International Search Report and Written Opinion for PCT Application No. PCT/US2023/025806, Oct. 11, 2023, 16 pages.
Lee et al., "A New Semantic Descriptor for Data Association in Semantic SLAM", 2019 109th International Conference on Control, Automation and Systems (ICCAS), Jeju, Korea (South), 2019, pp. 1178-1181, doi: 10.23919/ICCAS47443.2019.8971639.
Liu et al., "Behavior-based navigation system of mobile robot in unknown environment", Industrial Control Comp. Dec. 25, 2017; 12: 28-30.
Song et al., "Environment model based path planning for mobile robot", Electronics Optics & Control, Jun. 30, 2006, 3: 102-104.
Wei et al., "A method of autonomous robot navigation in dynamic unknown environment", J Comp Res Devel. Sep. 30, 2005; 9: 1538-1543.
Zhao et al., "Machine vision-based unstructured road navigation path detection method", Trans Chinese Soc Agricult Mach. Jun. 25, 2007; 6: 202-204. (English Abstract not available).

\* cited by examiner

DIRECTED EXPLORATION FOR NAVIGATION IN DYNAMIC ENVIRONMENTS

CROSS REFERENCE TO RELATED APPLICATIONS

This application claims priority under 35 U.S.C. § 119(e) to U.S. Provisional Application 63/202,289, filed on Jun. 4, 2021. The disclosure of this prior application is considered part of the disclosure of this application and is hereby incorporated by reference in its entirety.

TECHNICAL FIELD

This disclosure relates generally to navigation of mobile robots.

BACKGROUND

A robot is a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., legs, wheels, or traction based mechanisms), or some combination of a manipulator and a mobile robot. Robots are utilized in a variety of industries including, for example, manufacturing, transportation, hazardous environments, exploration, and healthcare. As such, the ability of robots to traverse environments with obstacles provides additional benefits to such industries.

SUMMARY

An aspect of the present disclosure provides a computer-implemented method that when executed by data processing hardware causes the data processing hardware to perform operations. The operations include receiving a navigation route including a set of waypoints including a first waypoint and a second waypoint, generating a local obstacle map based on sensor data captured by a mobile robot, determining that the mobile robot is unable to execute a movement instruction along a path between the first waypoint and the second waypoint due to an obstacle obstructing the path, identifying a third waypoint based on the local obstacle map, and generating an alternative path to navigate the mobile robot to the third waypoint to avoid the obstacle.

Another aspect of the present disclosure provides a mobile robot including a locomotion structure and a navigation system configured to control the locomotion structure to coordinate movement of the mobile robot. The navigation system includes data processing hardware and memory hardware in communication with the data processing hardware, the memory hardware storing instructions that when executed on the data processing hardware cause the data processing hardware to perform operations. The operations include receiving a navigation route including a set of waypoints including a first waypoint and a second waypoint, generating a local obstacle map based on sensor data captured by the mobile robot, determining that the mobile robot is unable to execute a movement instruction along a path between the first waypoint and the second waypoint due to an obstacle obstructing the path, identifying a third waypoint based on the local obstacle map, generating an alternative path to navigate the mobile robot to the third waypoint to avoid the obstacle.

Another aspect of the present disclosure provides a computer-implemented method that when executed by data processing hardware causes the data processing hardware to perform operations. The operations include receiving a navigation route for a mobile robot. The navigation route includes a sequence of waypoints connected by edges. Each edge corresponds to movement instructions that navigate the mobile robot between waypoints of the sequence of waypoints. While the mobile robot is traveling along the navigation route, the operations include determining that the mobile robot is unable to execute a respective movement instruction for a respective edge of the navigation route due to an obstacle obstructing the respective edge, generating an alternative path to navigate the mobile robot to an untraveled waypoint in the sequence of waypoints, and resuming travel by the mobile robot along the navigation route. The alternative path avoids the obstacle.

In some implementations, generating the alternative path to the untraveled waypoint in the sequence of waypoints includes determining that the untraveled waypoint exists within a local obstacle map generated from current sensor data captured by a sensor system of the mobile robot. The current sensor data represents an area immediately surrounding the mobile robot. In further implementations, the local obstacle map includes an occupancy grid designating whether each cell in the occupancy grid includes a respective obstacle for the mobile robot. In other further implementations, determining that the untraveled waypoint exists within the local obstacle map includes, for each untraveled waypoint in the sequence of waypoints, identifying whether the respective untraveled waypoint exists within the local obstacle map. When the respective untraveled waypoint exists within the local obstacle map, generating the alternative path includes generating the alternative path from a current position of the mobile robot to the respective untraveled waypoint. In even further implementations, when the respective untraveled waypoint fails to exist within the local obstacle map, the operations further include moving the mobile robot toward a position of a respective untraveled waypoint while avoiding the obstacle until the respective untraveled waypoint exists within the local obstacle map.

In some embodiments, resuming travel by the mobile robot along the navigation route includes executing the movement instructions of the edges connecting an untraveled portion of the sequence of waypoints of the navigation route starting from the untraveled waypoint. In some examples, the navigation route is derived from a topological map that represents an environment as a plurality of waypoints interconnected by corresponding edges. In further examples, the topological map corresponds to a high-level map of the environment abstracted to remove metric details that fail to correspond to waypoints and edges. In other further examples, determining that the mobile robot is unable to execute the respective movement instruction for the respective edge includes determining that the topological map fails to provide an avoidance path that avoids the obstacle obstructing the respective edge.

In some implementations, the operations further include establishing a topological map for an environment by using an initial mapping process that navigates the mobile robot through the environment generating a plurality of waypoints corresponding to features of the environment and generating the navigation route using the topological map. In some embodiments, the alternative path forms a respective path between two waypoints previously not connected in the navigation route.

In some examples, each waypoint in the sequence of waypoints was previously recorded during an initial mapping of an environment and the obstacle obstructing the respective edge was previously undiscovered during the initial mapping of the environment. In some implementations, the alternative path avoiding the obstacle deviates from the navigation route.

Another aspect of the disclosure provides a mobile robot. The mobile robot includes a body, two or more legs coupled to the body, and a navigation system configured to coordinate movement for the two or more legs. The navigation system includes data processing hardware and memory hardware in communication with the data processing hardware. The memory hardware stores instructions that when executed on the data processing hardware cause the data processing hardware to perform operations. The operations include receiving a navigation route for a mobile robot. The navigation route includes a sequence of waypoints connected by edges. Each edge corresponds to movement instructions that navigate the mobile robot between waypoints of the sequence of waypoints. While the mobile robot is traveling along the navigation route, the operations include determining that the mobile robot is unable to execute a respective movement instruction for a respective edge of the navigation route due to an obstacle obstructing the respective edge, generating an alternative path to navigate the mobile robot to an untraveled waypoint in the sequence of waypoints, and resuming travel by the mobile robot along the navigation route. The alternative path avoids the obstacle.

In some implementations, generating the alternative path to the untraveled waypoint in the sequence of waypoints includes determining that the untraveled waypoint exists within a local obstacle map generated from current sensor data captured by a sensor system of the mobile robot. The current sensor data represents an area immediately surrounding the mobile robot. In further implementations, the local obstacle map includes an occupancy grid designating whether each cell in the occupancy grid includes a respective obstacle for the mobile robot. In other further implementations, determining that the untraveled waypoint exists within the local obstacle map includes, for each untraveled waypoint in the sequence of waypoints, identifying whether the respective untraveled waypoint exists within the local obstacle map. When the respective untraveled waypoint exists within the local obstacle map, generating the alternative path includes generating the alternative path from a current position of the mobile robot to the respective untraveled waypoint. In even further implementations, when the respective untraveled waypoint fails to exist within the local obstacle map, the operations further include moving the mobile robot toward a position of a respective untraveled waypoint while avoiding the obstacle until the respective untraveled waypoint exists within the local obstacle map.

In some embodiments, resuming travel by the mobile robot along the navigation route includes executing the movement instructions of the edges connecting an untraveled portion of the sequence of waypoints of the navigation route starting from the untraveled waypoint. In some examples, the navigation route is derived from a topological map that represents an environment as a plurality of waypoints interconnected by corresponding edges. In further examples, the topological map corresponds to a high-level map of the environment abstracted to remove metric details that fail to correspond to waypoints and edges. In other further examples, determining that the mobile robot is unable to execute the respective movement instruction for the respective edge includes determining that the topological map fails to provide an avoidance path that avoids the obstacle obstructing the respective edge.

In some implementations, the operations further include establishing a topological map for an environment by using an initial mapping process that navigates the mobile robot through the environment generating a plurality of waypoints corresponding to features of the environment and generating the navigation route using the topological map. In some embodiments, the alternative path forms a respective path between two waypoints previously not connected in the navigation route.

In some examples, each waypoint in the sequence of waypoints was previously recorded during an initial mapping of an environment and the obstacle obstructing the respective edge was previously undiscovered during the initial mapping of the environment. In some implementations, the alternative path avoiding the obstacle deviates from the navigation route.

The details of the one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
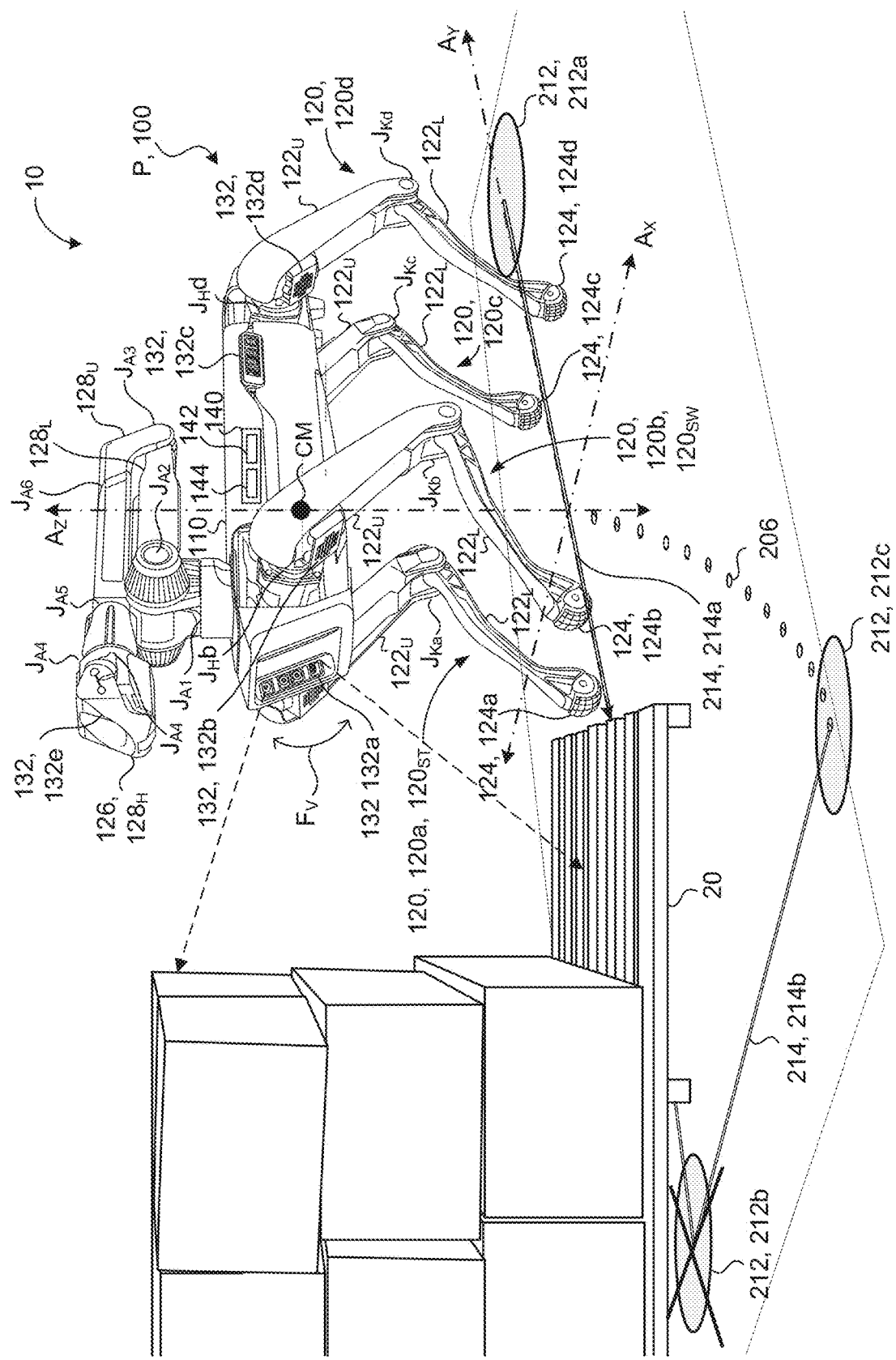
FIG. 1A is a perspective view of an example robot for performing directed exploration.

To navigate about environments, mobile robots may use some degree of mapping. Maps may contain stored information that informs the robot as to details about an environment.

One type of map for navigation is a topological map, which is a diagram abstracting an area to be represented by a particular type (or subset) of information about the area. For example, with only a particular type or subset of information about an area, a topological map defines the area relationally using the particular information. For instance, a topological map represents a set of places by the relationship between these places. In this respect, a topological map may lack scale or other detailed metric data, such as distance and direction, while maintaining a relationship between points or places. One such example of a topological map is a map of a train line where the map depicts the train's route as a series of connected stops without further precise details such as the distance between stops.

Another form of a map representation is referred to as a metric map. Metric maps are derived from a more precise mapping framework when compared to topological maps. Metric maps represent locations of objects (e.g., obstacles) in an environment based on precise geometric coordinates (e.g., two-dimensional coordinates or three-dimensional coordinates). In order to effectively navigate a robot with a metric map, a robot typically operates with data indicating the robot's coordinate location with some degree of precision. Such data allows determination of the robot's relationship to other objects represented according to geometric coordinates.

Since metric maps represent objects according to detailed spatial information (e.g., geometric coordinates), metric maps may be inherently computationally expensive. For example, generally the more detail present in a map, the greater the number of computational units used for computing operations on the map (e.g., read, write, and/or storage operations). Therefore, when a robot performs navigational processes using the metric map (e.g., querying the metric map for information to make navigation decisions), these processes may demand greater computing resources or take a longer time to occur when compared to navigational processes using a topological map. Topological maps may have this advantage because generally, by diagraming only particular relationships, a topological map includes less information compared to more detailed maps (i.e., metric maps).

With topological maps being typically less computationally expensive than metric maps, it is desirable to employ topological maps as much as possible for robotic navigation. Unfortunately, during navigation, situations may arise where topological maps do not provide enough detailed information to guide the robot successfully to a specific destination.

One such situation that may occur during robotic navigation is that the robot encounters an object that obstructs the robot (referred to as an obstacle) in some unforeseeable way. When an unforeseeable obstacle occurs, a topological map that has abstracted the environment to a set of locations and a relationship among these locations is ill-equipped to provide the robot with a path that avoids the obstacle while continuing to a specific destination. In other words, the presence of an unforeseeable obstacle may break or interfere with the relationship between the set of locations represented in a topological map. Without further detailed information to guide the robot, such a broken relationship may cause the robot to fail to achieve navigation to a target destination using the topological map.

The situation with an unforeseeable obstacle is not uncommon because real-world environments are dynamically changing. That is, structures or objects within an environment may have some temporary or nonpermanent nature. Known obstacles may move and new obstacles may be introduced to the environment. For instance, if the environment for the robot is a construction site, a construction site is a changing environment often including temporary or non-permanent objects, such as tools, tool storage, machinery, material, etc. Dynamic changes (or changes over time) to an environment pose an issue for a robot deployed to perform some task within the dynamically changing environment. This may be especially true when the robot operates autonomously or semi-autonomously.

For localization and navigation purposes, a robot can be initially taught an environment by a mapping process. In one example of a mapping process, an operator of the robot initially guides the robot through the environment while collecting sensor data from sensors associated with the robot. The sensor data (e.g., image data or point cloud data) gathered during this initial mapping process allows the robot to construct a map of the environment. For example, the initial mapping process generates a topological map of locations recorded during the initial mapping process and the relationship between these locations to inform the robot how to navigate along a path from location to location.

When the robot proceeds to use a topological map for navigation in the mapped environment, an obstacle not recognized or discovered during the initial mapping process is an unforeseeable object that will not be accounted for in the topological map. Therefore, if the robot only navigates using a navigation route from the topological map, an unforeseeable object encountered by the robot will hinder (or even entirely prevent) complete execution of the navigation route.

To address some of these issues, the mobile robot may use a directed exploration approach for its navigation system. A directed exploration approach functions as a type of hybrid navigation system that utilizes both a topological map and a more detailed metric map. For instance, during navigation, a topological map guides the robot unless or until the robot encounters an unforeseeable obstacle. Here, once the robot encounters the unforeseeable obstacle, the navigation system then switches temporarily to a local navigation map to determine if the robot can find a path that temporarily deviates from the navigation route of the topological map to avoid the obstacle and enables the robot to resume some portion of the navigation route (e.g., to travel to a destination specified by the navigation route).

For example, while the robot moves along a navigation route, the robot may be generating a local obstacle map for an area immediately surrounding the robot (e.g., generates a grid of some size adjacent to the robot). In this example, when the robot encounters an unforeseeable obstacle that impedes the navigation path, the robot uses the local obstacle map to determine a path that avoids the obstacle and continues the robot on the navigation route. By generating an obstacle avoidance path with the local obstacle map that merges with the original navigation path, the navigation system may once again guide the robot with the navigation path from the topological map instead of continuing to use (e.g., exclusively or predominantly) the local obstacle map after avoidance of the unforeseeable obstacle. This directed exploration approach may therefore minimize the computing cost associated with the navigation system.

Figure 1B:
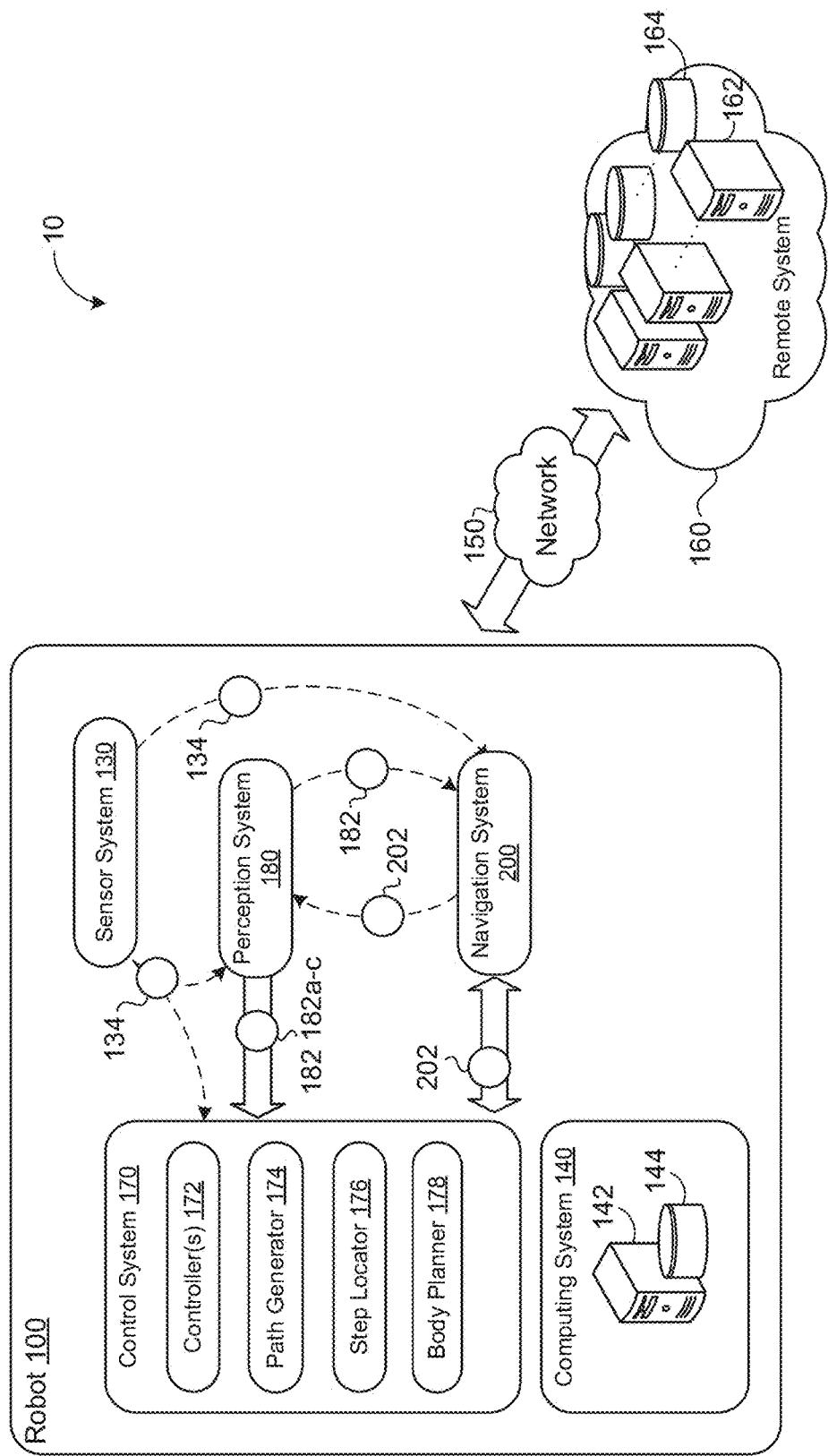
FIG. 1B is a schematic view of example systems of the robot of FIG. 1A.

Referring to example of FIGS. 1A and 1B, the robot 100 includes a body 110 with one or more locomotion-based structures (locomotion structures) such as legs 120a-d coupled to the body 110 that enable the robot 100 to move within the environment 10. In some examples, each leg 120 is an articulable structure such that one or more joints J permit members 122 of the leg 120 to move. For instance, each leg 120 includes a hip joint $J_H$ (for example, $J_{Hb}$ and $J_{Hd}$ in FIG. 1A) coupling an upper member 122, $122_U$ of the leg 120 to the body 110 and a knee joint $J_K$ (for example, $J_{Ka}$, $J_{Kb}$, $J_{Kc}$, and $J_{Kd}$ in FIG. 1A) coupling the upper member $122_U$ of the leg 120 to a lower member $122_L$ of the leg 120. Although FIG. 1A depicts a quadruped robot with four legs 120a-d, the robot 100 may include any number of legs or other locomotion structures (e.g., a biped or humanoid robot with two legs, or other arrangements of one or more legs) that provide a means to traverse the terrain within the environment 10.

In order to traverse the terrain, each leg 120 has a distal end 124 that contacts a surface of the terrain (i.e., a traction surface). In other words, the distal end 124 of the leg 120 is the end of the leg 120 used by the robot 100 to pivot, plant, or generally provide traction during movement of the robot 100. For example, the distal end 124 of a leg 120 corresponds to a foot of the robot 100. In some examples, though not shown, the distal end 124 of the leg 120 includes an ankle joint such that the distal end 124 is articulable with respect to the lower member $122_L$ of the leg 120.

In the examples shown, the robot 100 includes an arm 126 that functions as a robotic manipulator. The arm 126 may be configured to move about multiple degrees of freedom in order to engage elements of the environment 10 (e.g., objects within the environment 10). In some examples, the arm 126 includes one or more members 128, where the members 128 are coupled by arm joints $J_A$ (for example, $J_{A1}$, $J_{A2}$, $J_{A3}$, $J_{A4}$, $J_{A5}$, and $J_{A6}$ in FIG. 1A) such that the arm 126 may pivot or rotate about the joint(s) $J_A$. For instance, with more than one member 128, the arm 126 may be configured to extend or to retract. To illustrate an example, FIG. 1A depicts the arm 126 with three members 128 corresponding to a lower member $128_L$, an upper member $128_U$, and a hand member $128_H$ (e.g., also referred to as an end-effector $128_H$). Here, the lower member $128_L$ may rotate or pivot about one or more arm joints $J_A$ located adjacent to the body 110 (e.g., where the arm 126 connects to the body 110 of the robot 100). For example, FIG. 1A depicts the arm 126 able to rotate about a first arm joint $J_{A1}$ or yaw arm joint. With a yaw arm joint, the arm 126 is able to rotate in 360 degrees (or some portion thereof) axially about a vertical gravitational axis (e.g., shown as Az) of the robot 100. The lower member $128_L$ may pivot (e.g., while rotating) about a second arm joint $J_{A2}$. For instance, the second arm joint $J_{A2}$ (shown adjacent the body 110 of the robot 100) allows the arm 126 to pitch to a particular angle (e.g., raising or lowering one or more members 128 of the arm 126). The lower member $128_L$ is coupled to the upper member $128_U$ at a third arm joint $J_{A3}$ and the upper member $128_U$ is coupled to the hand member $128_H$ at a fourth arm joint $J_{A4}$.

In some examples, such as FIG. 1A, the hand member $128_H$ or end-effector $128_H$ is a mechanical gripper that includes a one or more moveable jaws configured to perform different types of grasping of elements within the environment 10. In the example shown, the end-effector $128_H$ includes a fixed first jaw and a moveable second jaw that grasps objects by clamping the object between the jaws. The moveable jaw is configured to move relative to the fixed jaw in order to move between an open position for the gripper and a closed position for the gripper (e.g., closed around an object).

In some implementations, the arm 126 may include additional joints $J_A$ such as the fifth arm joint $J_{A5}$ and/or the sixth arm joint $J_{A6}$. The fifth joint $J_{A5}$ may be located near the coupling of the upper member $128_U$ to the hand member $128_H$ and functions to allow the hand member $128_H$ to twist or to rotate relative to the lower member $128_U$. In other words, the fifth arm joint $J_{A4}$ may function as a twist joint similarly to the fourth arm joint $J_{A4}$ or wrist joint of the arm 126 adjacent the hand member $128_H$. For instance, as a twist joint, one member coupled at the joint J may move or rotate relative to another member coupled at the joint J (e.g., a first member portion coupled at the twist joint is fixed while the second member portion coupled at the twist joint rotates). Here, the fifth joint $J_{A5}$ may also enable the arm 126 to turn in a manner that rotates the hand member $128_H$ such that the hand member $128_H$ may yaw instead of pitch. For instance, the fifth joint $J_{A5}$ allows the arm 126 to twist within a 180 degree range of motion such that the jaws associated with the hand member $128_H$ may pitch, yaw, or some combination of both. This may be advantageous for hooking some portion of the arm 126 around objects or refining the how the hand member $128_H$ grasps an object. The sixth arm joint $J_{A6}$ may function similarly to the fifth arm joint $J_{A5}$ (e.g., as a twist joint). For example, the sixth arm joint $J_{A6}$ also allows a portion of an arm member 128 (e.g., the upper arm member $128_U$) to rotate or twist within a 180 degree range of motion (e.g., with respect to another portion of the arm member 128 or another arm member 128). Here, a combination of the range of motion from the fifth arm joint $J_{A5}$ and the sixth arm joint $J_{A6}$ may enable 360 degree rotation. In some implementations, the arm 126 connects to the robot 100 at a socket on the body 110 of the robot 100. In some configurations, the socket is configured as a connector such that the arm 126 may attach or detach from the robot 100 depending on whether the arm 126 is needed for operation. In some examples, the first and second arm joints $J_{A1,2}$ may be located at, adjacent to, or a portion of the socket that connects the arm 126 to the body 110.

The robot 100 has a vertical gravitational axis (e.g., shown as a Z-direction axis $A_Z$) along a direction of gravity, and a center of mass CM, which is a position that corresponds to an average position of all parts of the robot 100 where the parts are weighted according to their masses (i.e., a point where the weighted relative position of the distributed mass of the robot 100 sums to zero). The robot 100 further has a pose P based on the CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (i.e., the combination of the position of the CM of the robot and the attitude or orientation of the robot 100). Here, a height generally refers to a distance along the z-direction (e.g., along a z-direction axis $A_Z$). The sagittal plane of the robot 100 corresponds to the Y-Z plane extending in directions of a y-direction axis $A_Y$ and the z-direction axis $A_Z$. In other words, the sagittal plane bisects the robot 100 into a left and a right side. Generally perpendicular to the sagittal plane, a ground plane (also referred to as a transverse plane) spans the X-Y plane by extending in directions of the x-direction axis $A_X$ and the y-direction axis $A_Y$. The ground plane refers to a ground surface 14 where distal ends 124 of the legs 120 of the robot 100 may generate traction to help the robot 100 move within the environment 10. Another anatomical plane of the robot 100 is the frontal plane that extends across the body 110 of the robot 100 (e.g., from a left side of the robot 100 with a first leg 120a to a right side of the robot 100 with a second leg 120b). The frontal plane spans the X-Z plane by extending in directions of the x-direction axis $A_X$ and the z-direction axis $A_z$.

In order to maneuver within the environment 10 or to perform tasks using the arm 126, the robot 100 includes a sensor system 130 (also referred to as a vision system) with one or more sensors 132, 132a-n. For instance, FIG. 1A illustrates a first sensor 132, 132a mounted at a head of the robot 100, a second sensor 132, 132b mounted near the hip of the second leg 120b of the robot 100, a third sensor 132, 132c corresponding one of the sensors 132 mounted on a side of the body 110 of the robot 100, a fourth sensor 132, 132d mounted near the hip of the fourth leg 120d of the robot 100, and a fifth sensor 132, 132e mounted at or near the end-effector $128_H$ of the arm 126 of the robot 100. The sensors 132 may include vision/image sensors, inertial sensors (e.g., an inertial measurement unit (IMU)), force sensors, and/or kinematic sensors. Some examples of sensors 132 include a camera such as a stereo camera, a time-of-flight (TOF) sensor, a scanning light-detection and ranging (LIDAR) sensor, or a scanning laser-detection and ranging (LADAR) sensor. In some examples, the sensor 132 has a corresponding field(s) of view $F_V$ defining a sensing range or region corresponding to the sensor 132. For instance, FIG. 1A depicts a field of a view $F_V$ for the robot 100. Each sensor 132 may be pivotable and/or rotatable such that the sensor 132 may, for example, change the field of view $F_V$ about one or more axis (e.g., an x-axis, a y-axis, or a z-axis in relation to a ground plane). In some examples, multiple sensors 132 may be clustered together (e.g., similar to the first sensor 132a) to stitch a larger field of view $F_V$ than any single sensor 132. With sensors 132 placed about the robot 100, the sensor system 130 may have a 360 degree view or a nearly 360 degree view of the surroundings of the robot 100.

When surveying a field of view $F_V$ with a sensor 132, the sensor system 130 generates sensor data 134 (e.g., image data) corresponding to the field of view $F_V$. The sensor system 130 may generate the field of view $F_V$ with a sensor 132 mounted on or near the body 110 of the robot 100 (e.g., sensor(s) 132a, 132b). The sensor system may additionally and/or alternatively generate the field of view $F_V$ with a sensor 132 mounted at or near the end-effector $128_H$ of the arm 126 (e.g., sensor(s) 132c). The one or more sensors 132 may capture sensor data 134 that defines the three-dimensional point cloud for the area within the environment 10 about the robot 100. In some examples, the sensor data 134 is image data that corresponds to a three-dimensional volumetric point cloud generated by a three-dimensional volumetric image sensor 132. Additionally or alternatively, when the robot 100 is maneuvering within the environment 10, the sensor system 130 gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg 120 or arm 126 of the robot 100. With the sensor data 134, various systems of the robot 100 may use the sensor data 134 to define a current state of the robot 100 (e.g., of the kinematics of the robot 100) and/or a current state of the environment 10 about the robot 100. In other words, the sensor system 130 may communicate the sensor data 134 from one or more sensors 132 to any other system of the robot 100 in order to assist the functionality of that system.

In some implementations, the sensor system 130 includes sensor(s) 132 coupled to a joint J. Moreover, these sensors 132 may couple to a motor M that operates a joint J of the robot 100 (e.g., sensors 132, 132b-d). Here, these sensors 132 generate joint dynamics in the form of joint-based sensor data 134. Joint dynamics collected as joint-based sensor data 134 may include joint angles (e.g., an upper member $122_U$ relative to a lower member $122_L$ or hand member $128_H$ relative to another member of the arm 126 or robot 100), joint speed, joint angular velocity, joint angular acceleration, and/or forces experienced at a joint J (also referred to as joint forces). Joint-based sensor data generated by one or more sensors 132 may be raw sensor data, data that is further processed to form different types of joint dynamics, or some combination of both. For instance, a sensor 132 measures joint position (or a position of member(s) 122 coupled at a joint J) and systems of the robot 100 perform further processing to derive velocity and/or acceleration from the positional data. In other examples, a sensor 132 is configured to measure velocity and/or acceleration directly.

As the sensor system 130 gathers sensor data 134, a computing system 140 stores, processes, and/or communicates the sensor data 134 to various systems of the robot 100 (e.g., the computing system 140, the control system 170, the perception system 180, and/or the navigation system 200). In order to perform computing tasks related to the sensor data 134, the computing system 140 of the robot 100 (which is schematically depicted in FIG. 1A and can be implemented in any suitable location(s), including internal to the robot 100) includes data processing hardware 142 and memory hardware 144. The data processing hardware 142 is configured to execute instructions stored in the memory hardware 144 to perform computing tasks related to activities (e.g., movement and/or movement-based activities) for the robot 100. Generally speaking, the computing system 140 refers to one or more locations of data processing hardware 142 and/or memory hardware 144.

In some examples, the computing system 140 is a local system located on the robot 100. When located on the robot 100, the computing system 140 may be centralized (e.g., in a single location/area on the robot 100, for example, the body 110 of the robot 100), decentralized (e.g., located at various locations about the robot 100), or a hybrid combination of both (e.g., including a majority of centralized hardware and a minority of decentralized hardware). To illustrate some differences, a decentralized computing system 140 may allow processing to occur at an activity location (e.g., at motor that moves a joint of a leg 120) while a centralized computing system 140 may allow for a central processing hub that communicates to systems located at various positions on the robot 100 (e.g., communicate to the motor that moves the joint of the leg 120).

Additionally or alternatively, the computing system 140 utilizes computing resources that are located remotely from the robot 100. For instance, the computing system 140 communicates via a network 150 with a remote system 160 (e.g., a remote server or a cloud-based environment). Much like the computing system 140, the remote system 160 includes remote computing resources, such as remote data processing hardware 162 and remote memory hardware 164. Here, sensor data 134 or other processed data (e.g., data processing locally by the computing system 140) may be stored in the remote system 160 and may be accessible to the computing system 140. In additional examples, the computing system 140 is configured to utilize the remote resources 162, 164 as extensions of the computing resources 142, 144 such that resources of the computing system 140 may reside on resources of the remote system 160.

In some implementations, as shown in FIGS. 1A and 1B, the robot 100 includes a control system 170 and a perception system 180. The perception system 180 is configured to receive the sensor data 134 from the sensor system 130 and process the sensor data 134 to generate perception maps 182. With the perception maps 182 generated by the perception system 180, the perception system 180 may communicate the perception maps 182 to the control system 170 in order to perform controlled actions for the robot 100, such as moving the robot 100 within the environment 10. In some examples, by having the perception system 180 separate from, yet in communication with the control system 170, processing for the control system 170 may focus on controlling the robot 100 while the processing for the perception system 180 focuses on interpreting the sensor data 134 gathered by the sensor system 130. For instance, these systems 170, 180 execute processing in parallel to ensure accurate, fluid movement of the robot 100 in an environment 10.

A given controller 172 may control the robot 100 by controlling movement about one or more joints J of the robot 100. In some configurations, the given controller 172 is software with programming logic that controls at least one joint J or a motor M which operates, or is coupled to, a joint J. For instance, the controller 172 controls an amount of force that is applied to a joint J (e.g., torque at a joint J). As programmable controllers 172, the number of joints J that a controller 172 controls is scalable and/or customizable for a particular control purpose. A controller 172 may control a single joint J (e.g., control a torque at a single joint J), multiple joints J, or actuation of one or more members 122, 128 (e.g., actuation of the hand member $128_H$) of the robot 100. By controlling one or more joints J, actuators or motors M, the controller 172 may coordinate movement for all different parts of the robot 100 (e.g., the body 110, one or more legs 120, the arm 126). For example, to perform a behavior with some movements, a controller 172 may be configured to control movement of multiple parts of the robot 100 such as, for example, two legs 120a-b, four legs 120a-d, the arm 126, or any combination of legs 120 and/or arm 126 (e.g., two or four legs 120 combined with the arm 126). In some examples, a controller 172 is configured as an object-based controller that is setup to perform a particular behavior or set of behaviors for interacting with an interactable object.

In some examples, the control system 170 includes at least one controller 172, a path generator 174, a step locator 176, and a body planner 178. The control system 170 may be configured to communicate with at least one sensor system 130 and any other system of the robot 100 (e.g., the perception system 180 and/or the navigation system 200). The control system 170 performs operations and other functions using the computing system 140. The controller 172 is configured to control movement of the robot 100 to traverse the environment 10 based on input or feedback from the systems of the robot 100 (e.g., the sensor system 130, the perception system 180, and/or the navigation system 200). This may include movement between poses and/or behaviors of the robot 100. For example, the controller 172 controls different footstep patterns, leg patterns, body movement patterns, or vision system-sensing patterns.

In some implementations, the control system 170 includes specialty controllers that are dedicated to a particular control purpose. These specialty controllers may include, but need not be limited to, the path generator 174, the step locator 176, and/or the body planner 178. Referring to FIG. 1B, the path generator 174 is configured to determine horizontal motion for the robot 100. For instance, the horizontal motion refers to translation (i.e., movement in the X-Y plane) and/or yaw (i.e., rotation about the Z-direction axis AZ) of the robot 100. The path generator 174 determines obstacles within the environment 10 about the robot 100 based on the sensor data 134. The path generator 174 communicates the obstacles to the step locator 176 such that the step locator 176 may identify foot placements for legs 120 of the robot 100 (e.g., locations to place the distal ends 124 of the legs 120 of the robot 100). The step locator 176 generates the foot placements (i.e., locations where the robot 100 should step) using inputs from the perception system 180 (e.g., map(s) 182). The body planner 178, much like the step locator 176, receives inputs from the perception system 180 (e.g., map(s) 182). Generally speaking, the body planner 178 is configured to adjust dynamics of the body 110 of the robot 100 (e.g., rotation, such as pitch or yaw and/or height) to successfully move about the environment 10.

The perception system 180 is a system of the robot 100 that helps the robot 100 to move more precisely in a terrain with various obstacles. As the sensors 132 collect sensor data 134 for the space about the robot 100 (i.e., the robot's environment 10), the perception system 180 uses the sensor data 134 to form one or more perception maps 182 for the environment 10. Once the perception system 180 generates a perception map 182, the perception system 180 is also configured to add information to the perception map 182 (e.g., by projecting sensor data 134 on a preexisting map) and/or to remove information from the perception map 182.

In some examples, the one or more perceptions maps 182 generated by the perception system 180 are a ground height map 182, 182a, a no step map 182, 182b, and/or a body obstacle map 182, 182c (collectively 182a-c in FIG. 1B). The ground height map 182a refers to a perception map 182 generated by the perception system 180 based on spatial occupancy of an area (e.g., the environment 10) divided into three-dimensional volume units (e.g., voxels from a voxel map). In some implementations, the ground height map 182a functions such that, at each X-Y location within a grid of the map 182 (e.g., designated as a cell of the ground height map 182a), the ground height map 182a specifies a height. In other words, the ground height map 182a conveys that, at a particular X-Y location in a horizontal plane, the robot 100 should step at a certain height.

The no step map 182b generally refers to a perception map that defines regions where the robot 100 is not allowed to step in order to advise the robot 100 when the robot 100 may step at a particular horizontal location (i.e., location in the X-Y plane). In some examples, much like the body obstacle map 182c and the ground height map 182a, the no step map 182b is partitioned into a grid of cells where each cell represents a particular area in the environment 10 about the robot 100. For instance, each cell is a three centimeter square. For ease of explanation, each cell exists within an X-Y plane in the environment 10. When the perception system 180 generates the no-step map 182b, the perception system 180 may generate a Boolean value map where the Boolean value map identifies no step regions and step regions. A no step region refers to a region of one or more cells where an obstacle exists while a step region refers to a region of one or more cells where an obstacle is not perceived to exist. The perception system 180 may further process the Boolean value map such that the no step map 182b includes a signed-distance field. Here, the signed-distance field for the no step map 182b includes a distance to a boundary of an obstacle (e.g., a distance to a boundary of the no step region) and a vector v (e.g., defining nearest direction to the boundary of the no step region) to the boundary of an obstacle.

The body obstacle map 182c generally determines whether the body 110 of the robot 100 may overlap a location in the X-Y plane with respect to the robot 100. In other words, the body obstacle map 182c identifies obstacles for the robot 100 to indicate whether the robot 100, by overlapping at a location in the environment 10, risks collision or potential damage with obstacles near or at the same location. As a map of obstacles for the body 110 of the robot 100, systems of the robot 100 (e.g., the control system 170) may use the body obstacle map 182c to identify boundaries adjacent, or nearest to, the robot 100 as well as to identify directions (e.g., an optimal direction) to move the robot 100 in order to avoid an obstacle. In some examples, much like other perception maps 182, the perception system 180 generates the body obstacle map 182c according to a grid of cells (e.g., a grid of the X-Y plane). Here, each cell within the body obstacle map 182c includes a distance from an obstacle and a vector pointing to the closest cell that is an obstacle (i.e., a boundary of the obstacle).

Referring further to FIG. 1B, the robot 100 also includes a navigation system 200. The navigation system 200 is a system of the robot 100 that navigates the robot 100 along a path referred to as a navigation route 202 (or simply route 202) in order to traverse an environment 10. The navigation system 200 may be configured to receive the navigation route 202 as an input or to generate the navigation route 202 (e.g., in its entirety or some portion thereof). To generate the navigation route 202 and/or to guide the robot 100 along the navigation route 202, the navigation system 200 is configured to operate in conjunction with the control system 170 and/or the perception system 180. For instance, the navigation system 200 receives perception maps 182 that may inform decisions performed by the navigation system 200 or otherwise influence some form of mapping performed by the navigation system 200 itself. The navigation system 200 may operate in conjunction with the control system 170 such that one or more controllers 172 and/or specialty controller(s) 174, 176, 178 may control the movement of components of the robot 100 (e.g., legs 120 and/or the arm 126) to navigate along the navigation route 202.

As the navigation system 200 guides the robot 100 through movements that follow the navigation route 202, the navigation system 200 is configured to determine whether the navigation route 202 becomes obstructed by an object. That is, the navigation route 202 is derived from a topological map 204 (see for example, FIG. 2A) that includes locations associated with movement instructions that dictate how to move from one location to another. The topological map 204 may correspond to a high-level map of the environment that is abstracted to remove metric details that fail to correspond to the locations and movement instructions. Put another way, the movement instructions are able to account for objects or other obstacles at the time of recording the locations to the topological map 204, but may not reflect objects or obstacles introduced to the environment or shifted since the time of recording.

Since the environment 10 may dynamically change from the time of recording the locations to the topological map 204, the navigation system 200 is configured to determine whether the navigation route 202 becomes obstructed by an object that was not previously discovered in its obstructed location when recording the locations being used by the navigation route 202. Stated differently, an object is in a location that obstructs the navigation route 202 during execution of the route 202 when the object exists in the path of the route 202 and the object was not present in that location when the location(s) of the navigation route 202 was recorded to the topological map 204. This results in the object being an "unforeseeable obstacle" in the navigation route 202 because the initial mapping process that informs the navigation route 202 did not recognize the object in the obstructed location. This may occur when an object is moved or introduced to a mapped environment.

When an unforeseeable obstacle obstructs the route 202, the navigation system 200 is configured to attempt to generate an alternative path 206 to a location in the route 202 that avoids the unforeseeable obstacle. This alternative path 206 may deviate from the navigation route 202 temporarily, but then resume the navigation route 202 after the deviation.

Unlike other approaches to generate an obstacle avoidance path, the navigation system 200 has the goal to only temporarily deviate from the route 202 to avoid the unforeseeable obstacle such that the robot 100 may return to using course features (e.g., like topological features from the topological map 204) for the navigation route 202.

In this sense, successful obstacle avoidance for the navigation system 200 is when an obstacle avoidance path both (i) avoids the unforeseeable obstacle and (ii) enables the robot 100 to resume some portion of the navigation route 202. This technique to merge back with the navigation route 202 after obstacle avoidance may be advantageous because the navigation route 202 may be important for task or mission performance for the robot 100 (or an operator of the robot 100). For instance, an operator of the robot 100 tasks the robot 100 to perform an inspection task at a location of the route 202. By generating an obstacle avoidance route that continues on the route 202 after obstacle avoidance, the navigation system 200 aims to promote task or mission success for the robot 100.

To illustrate, FIG. 1A depicts a navigation route 202 that includes three locations shown as waypoints 212 (e.g., shown as waypoints 212a, 212b, and 212c).

In the example of FIG. 1A, while moving along a first portion of the route 202 (e.g., shown as a first edge 214, 214a) from a first location (e.g., shown as a first waypoint 212a) to a second location (e.g., shown as a second waypoint 212b), the robot 100 encounters an unforeseeable obstacle 20 depicted as a partial pallet of boxes. This unforeseeable obstacle 20 blocks the robot 100 from completing the first portion 214a of the route 202 to the second location (e.g., shown as the second waypoint 212b). Here, the X over the second location symbolizes that the robot 100 is unable to successfully travel to the second location (second waypoint 212b) given the pallet of boxes 20. As depicted in FIG. 1A, the route 202 would normally have a second portion (e.g., shown as a second edge 214, 214b) that extends from the second location to a third location (e.g., shown as a third waypoint 212c). Due to the unforeseeable object 20, the navigation system 200 generates an alternative path 206 that directs the robot 100 to move to avoid the unforeseeable obstacle 20 and to travel to the third location (third waypoint 212c) of the navigation route 202 (e.g., from a point along the first portion of the route 202).

In this respect, the robot 100 may not be able to successfully navigate to one or more locations, such as the second location (second waypoint 212b), but may resume a portion of the navigation route 202 after avoiding the obstacle 20. For instance, the navigation route 202 includes more locations subsequent to the third location (waypoint 212c) and the alternative path 206 enables the robot 100 to continue to those locations after the alternative path 206 navigates the robot 100 to the third location (i.e., a location included in the route 202). The waypoint 212c is an untraveled waypoint along the navigation route 202 that in FIG. 1A the robot 100 has not yet reached.

In some implementations, an object that is an unforeseeable obstacle 20 (also referred to as obstacle 20) may be specific to the type of robot 100 performing navigation. That is, whether an object blocking a portion of the route 202 is truly an obstacle may vary based on the morphology of the robot 100 (e.g., the locomotion structures of the robot 100). For instance, some objects may not be considered "obstacles" because the robot 100 is implemented with a footpath range of motion that steps over the object. Here, if the robot 100 is able to step across the object without requiring deviation from the route 202, the object is not an obstacle. This is true even when the robot 100 may need to deviate from a nominal step height, but nonetheless execute a step height within the robot's capabilities. In contrast, if the robot 100 were a wheel-based or tracked-based robot, the robot 100 would not have the capability to step over the object, and most objects would cause these types of robots 100 to deviate from the route 202 to avoid the object. With a wheel-based or tracked-based robot, many objects that block the route 202 would be considered an unforeseeable obstacle 20. Although in situations where a wheel-based robot or tracked-based robot is able to wheel over the object, the object may also not be considered an obstacle for route navigation purposes. In some implementations, when the robot 100 is a quadruped robot 100 with four legs 120, there may be a situation when an object does not pose a foot placement issue (i.e., obstructs or hinders a foot touchdown), but nonetheless poses an obstruction for the body 110 of the robot 100. For instance, an object occupies a plane offset from the ground plane, but has open space underneath the plane. In this sense, for something that resembles a table or a platform, the robot 100 may be able to place one of its feet 124 underneath the occupied plane, but the body 110 of the robot 100 would collide with the plane. Here, due to the shape of the body 110 and the legs 120 (e.g., the legs 120 offset the body 110 from a support surface), this type of object would be considered an obstacle. For reasons such as this, the shape and/or design of the robot 100 may dictate whether an object actually functions as an obstacle 20.

Referring now to FIGS. 2A-2F, the navigation system 200 includes a navigation generator 210 and a route executor 220. The navigation generator 210 (also referred to as the navigation generator 210) is configured to construct a topological map 204 and to generate the navigation route 202 from the topological map 204. To generate the topological map 204, the navigation system 200 and, more particularly, the generator 210 records locations within an environment 10 that has been traversed or is being traversed by the robot 100 as waypoints 212. A waypoint 212 can correspond to a representation of what the robot 100 sensed (e.g., according to its sensor system 130) at a particular place within the environment 10. The generator 210 generates waypoints 212 based on the image data 134 collected by the sensor system 130 of the robot 100. For instance, a robot 100 may perform an initial mapping process where the robot 100 moves through the environment 10. While moving through the environment 10, systems of the robot 100, such as the sensor system 130 are gathering data (e.g., sensor data 134) as a means to understand the environment 10. By gathering an understanding of the environment 10, the robot 100 may later move about the environment 10 (e.g., autonomously, semi-autonomously, or with assisted operation by a user) using the information or a derivative thereof gathered from the initial mapping process.

In some implementations, the generator 210 builds the topological map 204 by executing at least one waypoint heuristic (e.g., waypoint search algorithm) that triggers the generator 210 to record a waypoint placement at a particular location in the topological map 204. For example, the waypoint heuristic is configured to detect a threshold feature detection within the image data 134 at a location of the robot 100 (e.g., when generating or updating the topological map 204).

The generator 210 (e.g., using a waypoint heuristic) may identify features within the environment 10 that function as reliable vision sensor features offering repeatability for the robot 100 to maneuver about the environment 10. For instance, a waypoint heuristic of the generator 210 is preprogrammed for feature recognition (e.g., programmed with stored features) or programmed to identify features where spatial clusters of volumetric image data 134 occur (e.g., corners of rooms or edges of walls). In response to the at least one waypoint heuristic triggering the waypoint placement, the generator 210 records the waypoint 212 on the topological map 204. This waypoint identification process may be repeated by the generator 210 as the robot 100 drives through an area (e.g., the robotic environment 10). For instance, an operator of the robot 100 manually drives the robot 100 through an area for an initial mapping process that establishes the waypoints 212 for the topological map 204.

When recording each waypoint 212, the generator 210 generally associates a waypoint edge 214 (also referred to as an edge 214) with a respective waypoint 212 such that the topological map 204 produced by the generator 210 includes both waypoints 212 and their respective edges 214. An edge 214 is configured to indicate how one waypoint 212 (e.g., a first waypoint 210*a*) is related to another waypoint 212 (e.g., a second waypoint 212*b*). For example, the edge 214 represents a positional relationship between waypoints 212 (e.g., adjacent waypoints 212). In other words, the edge 214 is a connection or designated path between two waypoints 212 (e.g., the edge 214*a* shown in FIG. 2A as a connection between a first waypoint 210*a* and a second waypoint 210*b*). For instance, the edge 214 is a path (e.g., a movement path for the robot 100) between the first waypoint 210*a* to the second waypoint 210*b*. Yet, in some examples, an edge 214 is not simply a line (or trajectory) for the robot 100 to follow. Rather each edge 214 includes movement instructions that inform the robot 100 how to move or navigate between waypoints 212 connected by the respective edge 214. Here, these movement instructions may include one or more pose transform that expresses how the robot 100 moves along the edge 214 between two waypoints 212.

Pose transformations may describe a position and/or orientation of one coordinate frame within an environment relative to another coordinate frame. In other words, the pose transformations serve as movement instructions that dictate one or more positions and/or orientations for the robot 100 to assume to successfully navigate along the edge 214 from a source waypoint 212 to a destination waypoint 212. In some implementations, the edge 214 includes a full three-dimensional transform (e.g., six numbers). Some of these numbers include various estimates such as, for example, a dead reckoning pose estimation, a vision based estimation, or other estimations based on kinematics and/or inertial measurements of the robot 100.

In some examples, the edge 214 includes annotations that provide further indication/description of the environment 10. Some examples of annotations include a description or an indication that an edge 214 is associated with or located on some feature of the environment 10. For instance, an annotation for an edge 214 specifies that the edge 214 is located on stairs or crosses a doorway. These annotations may aid the robot 100 during maneuvering especially when visual information is missing or lacking (e.g., a void such as a doorway). In some configurations, the annotations include directional constraints (also may be referred to as pose constraints). A directional constraint of the annotation may specify an alignment and/or an orientation (e.g., a pose) of the robot 100 at a particular environment feature. For example, the annotation specifies a particular alignment or pose for the robot 100 before traveling along stairs or down a narrow corridor which may restrict the robot 100 from turning.

In some implementations, each waypoint 212 of the topological map 204 also includes sensor data 134 corresponding to data collected by the sensor system 130 of the robot 100 when the generator 210 recorded a respective waypoint 212 to the topological map 204. Here, the sensor data 134 at a waypoint 212 may enable the robot 100 to localize by comparing real-time sensor data 134 gathered as the robot 100 traverses the environment 10 according to the topological map 204 (e.g., a route 202 from the topological map 204) with sensor data 134 stored for the waypoints 212 of the topological map 204.

In some configurations, after the robot 100 moves along an edge 214 (e.g., with the intention to be at a target waypoint 212), the robot 100 is configured to localize by directly comparing real-time sensor data 134 with the topological map 204 (e.g., sensor data 134 associated with the intended target waypoint 212 of the topological map 204). Here, by storing raw or near-raw sensor data 134 with minimal processing for the waypoints 212 of the topological map 204, the robot 100 may use real-time sensor data 134 to localize efficiently as the robot 100 maneuvers within the mapped environment 10. In some examples, an iterative closest points (ICP) algorithm localizes the robot 100 with respect to a waypoint 212.

Because the generator 210 produces the topological map 204 using waypoints 212 and edges 214, the topological map 204 may be locally consistent (e.g., spatially consistent within an area due to neighboring waypoints), but does not need to be globally accurate and/or consistent. That is, as long as geometric relations (e.g., edges 214) between adjacent waypoints 212 are roughly accurate, the topological map 204 does not require precise global metric localization for the robot 100 and sensed objects within the environment 10. Without requiring this for the topological map 204, a navigation route 202 derived or built using the topological map 204 also does not need precise global metric information. Moreover, since the topological map 204 may be built only using waypoints 212 and a relationship between waypoints (e.g., edges 214), the topological map 204 may be considered an abstraction or high-level map in comparison to a metric map. That is, the topological map 204 can be devoid of other metric data about the mapped environment that does not relate to waypoints 212 or their corresponding edges 214. For instance, the mapping process (e.g., by the generator) that creates the topological map 204 may not store or record other metric data or the mapping process may remove recorded metric data to form a topological map 204 of waypoints 212 and edges 214.

Either way, navigating with the topological map 204 may simplify the hardware needed for navigation and/or the computational resources used during navigation. That is, topological-based navigation may operate with low-cost vision and/or low-cost inertial measurement unit (IMU) sensors when compared to navigation using metric localization that often requires expensive LIDAR sensors and/or expensive IMU sensors. Metric-based navigation tends to demand more computational resources than topological-based navigation because metric-based navigation often performs localization at a much higher frequency than topological navigation (e.g., with waypoints 212). For instance, the common navigation approach of Simultaneous Localization and Mapping (SLAM) using a global occupancy grid is constantly performing robot localization.

Figure 2A:
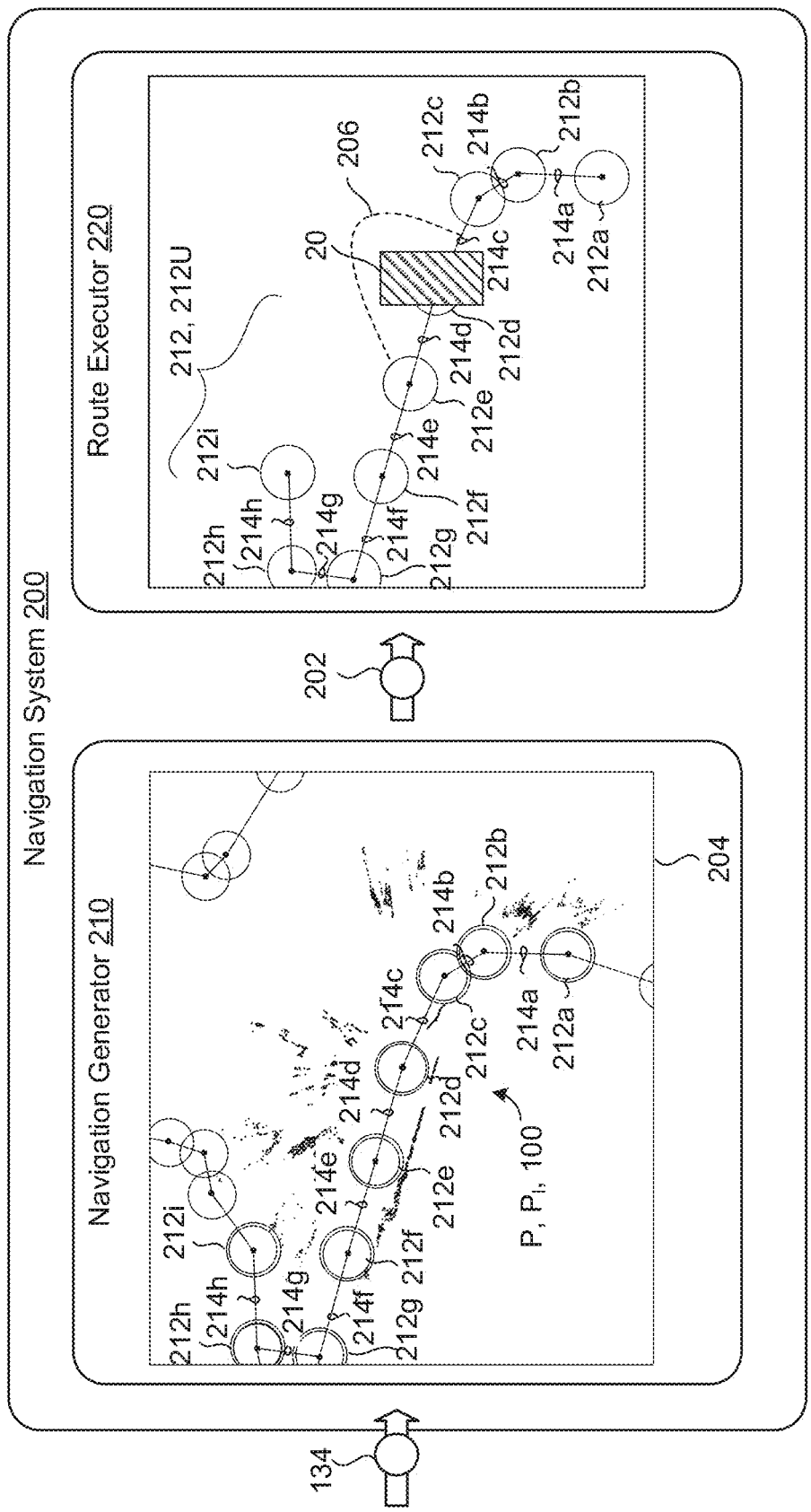
FIG. 2A is a schematic view of a first example of a navigation system for a robot.

Referring to FIG. 2A, the generator 210 records a plurality of waypoints 212, 212a-i on a topological map 204. From the plurality of recorded waypoints 212, the generator 210 selects some number of recorded waypoints 212 as a sequence of waypoints 212 that form the navigation route 202 for the robot 100. In some examples, an operator of the robot 100 may use the generator 210 to select or build a sequence of waypoints 212 to form the navigation route 202. In some implementations, the generator 210 generates the route 202 based on receiving a destination location and a starting location for the robot 100. For instance, the generator 210 matches the starting location with a nearest waypoint 212 and similarly matches the destination location with a nearest waypoint 212. The generator 210 may then select some number of waypoints 212 between these nearest waypoints 212 to generate the route 202. In some configurations, the generator 210 receives a task or mission and generates a route 202 as a sequence of waypoints 212 that will achieve that task or mission. For instance, for a mission to inspect different locations on a pipeline, the generator 210 generates a route 202 that includes waypoints 212 that coincide with the inspection locations. In the example shown in FIG. 2A, the generator 210 generates a route 202 with a sequence of waypoints 212 that include nine waypoints 212a-i and their corresponding edges 214a-h. FIG. 2A illustrates each waypoint 212 of the route 202 in a double circle while recorded waypoints 212 that are not part of the route 202 only have a single circle. The generator 210 then communicates the route 202 to the route executor 220.

The route executor 220 (also referred to as the executor 220) is configured to receive and to execute the navigation route 202. To execute the navigation route 202, the executor 220 may coordinate with other systems of the robot 100 to control the locomotion-based structures of the robot 100 (e.g., the legs) to drive the robot 100 along the route 202 through the sequence of waypoints 212. For instance, the executor 220 communicates the movement instructions of edges 214 connecting waypoints 212 in the sequence of waypoints 212 of the route 202 to the control system 170. The control system 170 may use these movement instructions to position the robot 100 (e.g., in an orientation) according to one or more pose transforms to successfully move the robot 100 along the edges 214 of the route 202.

While the robot 100 is traveling along the route 202, the executor 220 is also configured to determine whether the robot 100 is unable to execute a particular movement instruction for a particular edge 214. For instance, the robot 100 is unable to execute a movement instruction for an edge 214 because the robot 100 encounters an unforeseeable obstacle 20 while moving along the edge 214 to a waypoint 212. Here, the executor 220 recognizes that an unforeseeable obstacle 20 blocks the path of the robot 100 (e.g., using real-time or near real-time sensor data 134) or otherwise precludes the robot 100 from executing the movement instructions for the edge 214 and is configured to determine whether an alternative path 206 for the robot 100 exists to an untraveled waypoint 212, 212U in the sequence of the route 202. An untraveled waypoint 212U refers to a waypoint 212 of the waypoint sequence for the route 202 that the robot 100 has not already successfully traveled to. For instance, if the robot 100 had already traveled to three of the nine waypoints 212a-c of the route 202, the executor 220 would try to find an alternative path 206 to one or the remaining six waypoints 212d-i if possible.

The executor 220 may first attempt to find the alternative path 206 to the next untraveled-to waypoint 212 before attempting to find the alternative path 206 to subsequent untraveled to-waypoints 212, such as attempting to find the alternative path 206 from waypoint 212c to waypoint 212d before finding the alternative path 206 from waypoint 212c to one of waypoints 212e-i. In this sense, the alternative path 206 is an obstacle avoidance path that avoids the unforeseeable obstacle 20 and also a path that allows the robot 100 to resume the navigation route 202 (e.g., toward a particular goal or task). This means that after the robot 100 travels along the alternative path 206 to a destination of an untraveled waypoint 212U, the executor 220 continues executing the route 202 from that destination of the alternative path 206. This approach enables the robot 100 to return to navigation using the sparse topological map 204. In other words, the alternative path 206 avoiding the obstacle 20 may deviate from the navigation route 202 to avoid the obstacle 20 and merge with or continue the navigation route 202 after avoiding the obstacle 20 to return to navigating using the less resource-intensive topological map 204.

For example, referring to the example of FIG. 2A, if the unforeseeable obstacle 20 blocks some portion of the third edge 214c (e.g., blocks some portion of the third edge 214c and the fourth waypoint 212d), the robot 100 has already traveled to three waypoints 212a-c; therefore, the executor 220 generates an alternative path 206 avoiding the unforeseeable obstacle 20 to the fifth waypoint 212e, which is an untraveled waypoint 212U. The robot 100 may then continue the sequence of waypoints 212 for the route 202 from the fifth waypoint 212e. This means that the robot 100 would then travel to the untraveled portion following the sequence of waypoints 212 for the route 202 (e.g., by using the movement instructions of edges 214 of the untraveled portion). In the example, the robot 100 would travel from the fifth waypoint 212e to the sixth, seventh, eighth, and finally ninth waypoints 212, 212f-i barring some other unforeseeable object 20. This means that, although the unforeseeable object 20 was present along the third edge 214c, the robot 100 only missed a single waypoint, the fourth waypoint 212d, during its movement path while executing the route 202.

In some implementations, when the executor 220 determines that an unforeseeable obstacle 20 blocks an edge 214, the executor 220 identifies that the topological map 204 fails to provide an alternative route 206 avoiding the unforeseeable obstacle 20. This is usually the case because the topological map 204 includes waypoints 212 and edges 214 that were recorded during the mapping process (e.g., by the generator 210). Since the unforeseeable obstacle 20 was not present at that time of mapping, the topological map 204 fails to be able to generate an alternative path 206 on its own.

In other words, the generator 210 did not anticipate needing a path or edge 214 resembling the alternative path in FIG. 2A from the third waypoint 212c to the fifth waypoint 212e. This also means that the alternative path 206 is likely a path that does not correspond to an existing edge 214 in the topological map 204. Stated differently, the alternative path 206 results in a path between two waypoints 212 that were previously unconnected (e.g., by an edge 214) in the navigation route 202 In other implementations, the executor 220 assumes that the presence of an unforeseeable obstacle 20 necessitates that the executor 220 use other means besides the topological map 204 to generate the alternative path 206.

In some configurations, when an edge 214 is blocked by an unforeseeable object 20, the executor 220 resorts to other maps that are available from the systems of the robot 100. In some examples, the executor 220 uses or generates a local obstacle map 222 from current sensor data 134 captured by the sensor system 130 of the robot 100. Here, the local obstacle map 222 may refer to a more detailed map of the environment 10 than the topological map 204, but only for a local area surrounding the robot 100 (e.g., a three meter by three meter square area).

In some configurations, the local obstacle map 222 includes an occupancy grid where each cell within the grid designates whether an obstacle is present in that cell or not. The executor 220 may then generate the alternative path 206 using the unoccupied cells of the occupancy grid in combination with the positions of the untraveled waypoints 212U.

In some examples, the local obstacle map 222 is formed in whole or in part using the perception maps 182 from the perception system 180 (e.g., the ground height map 182a, the no step map 182b, and/or the body obstacle map 182c) for the local area surrounding the robot 100.

With the local obstacle map 222 of finite size, the executor 220 may determine which untraveled waypoint 212U should be the destination of the alternative path 206 by determining which untraveled waypoints 212U exists within the bounds of the local obstacle map 222.

Figure 2B:
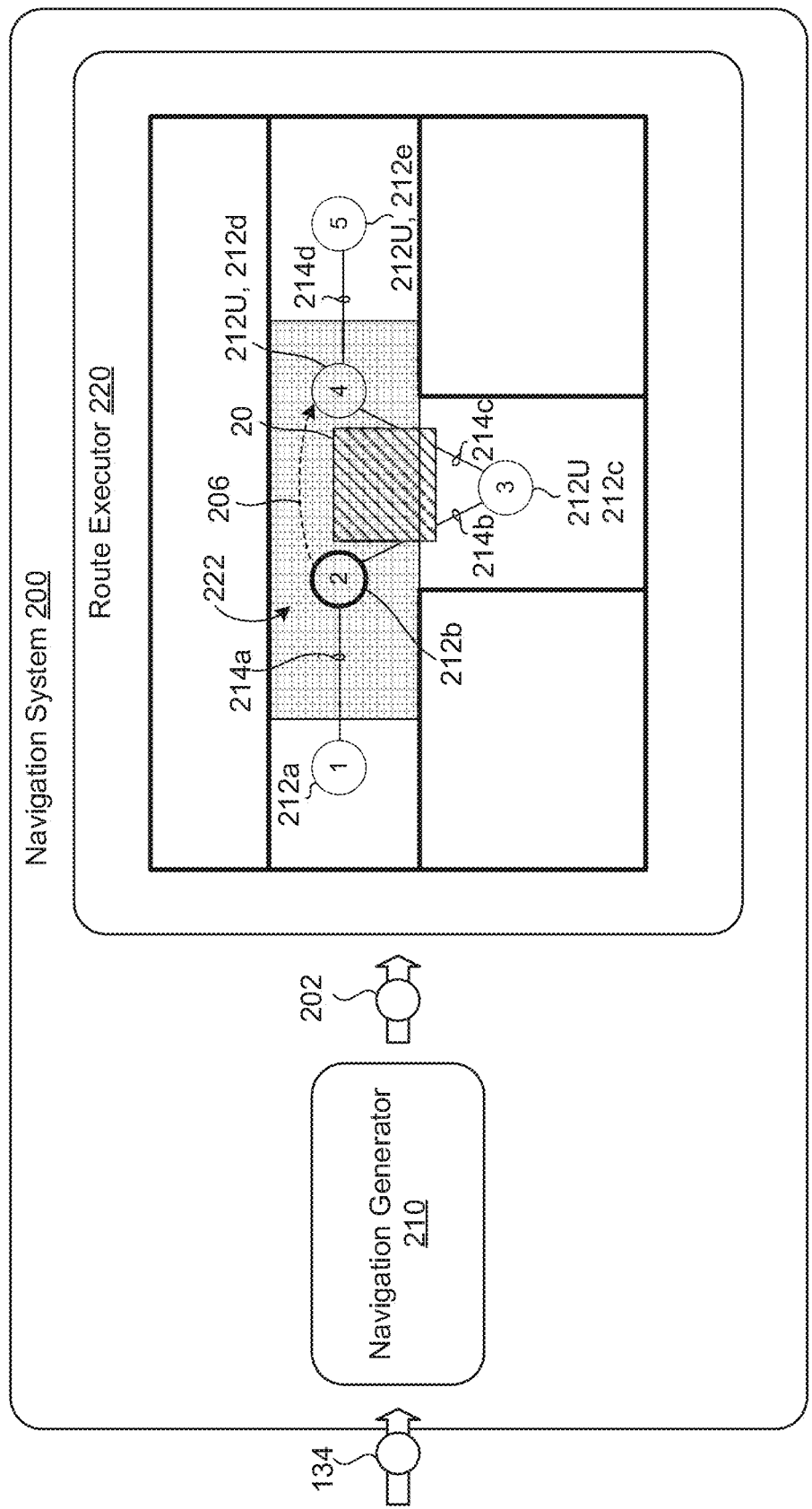
FIG. 2B is a schematic view of a second example of a navigation system for a robot.

Referring to the example of FIG. 2B, the navigation route 202 includes a sequence of five waypoints 212a-e. Here, the robot 100 has traveled to the second waypoint 212b only to discover an unforeseeable obstacle 20 blocking a second edge 214b connecting the second waypoint 212b and a third waypoint 212c. To determine the alternative path 206 (e.g., the destination of the alternative path 206), the executor 220 determines which untraveled waypoints 212U exist within the bounds of the local obstacle map 222. In this example, the untraveled waypoints 212U are the third, fourth, and fifth waypoints 212c-e and only the fourth waypoint 212d is within the bounds of the local obstacle map 222.

For reference, FIG. 2B illustrates the local obstacle map 222 as a grid. Although the third waypoint 212c and the fifth waypoint 212e are also untraveled waypoints 212U in addition to the fourth waypoint 212d, neither of these waypoints 212c, 212e exist within the bounds of the local obstacle map 222. In a sense, the local obstacle map 222 is therefore unaware how to generate an alternative path 206 to either of the third or fifth waypoints 212c, 212e. Since the fourth waypoint 212d is the only waypoint 212 within the bounds of the local obstacle map 222, the executor 220 generates the alternative path 206 avoiding the obstacle 20 to the fourth waypoint 212d. The robot 100 would then proceed to follow the route 202 from the fourth waypoint 212d to the fifth waypoint 212e along the fourth edge 214d.

In some examples, the executor 220 functions methodically such that, for each untraveled waypoint 212U, the executor 220 identifies whether a respective untraveled waypoint 212U exists within the local obstacle map 222. For instance, the executor 220 performs this identification for each untraveled waypoint sequentially following the waypoint sequence of the route 202. For the example of FIG. 2B, this would mean that the executor 220 first determines whether the third waypoint 212c is within the local obstacle map 222, which it is not. The executor 220 next determines whether the fourth waypoint 212d is within the local obstacle map 222, which it is. The executor 220 then determines whether the fifth waypoint 212e is in the local obstacle map 222.

Figure 2C:
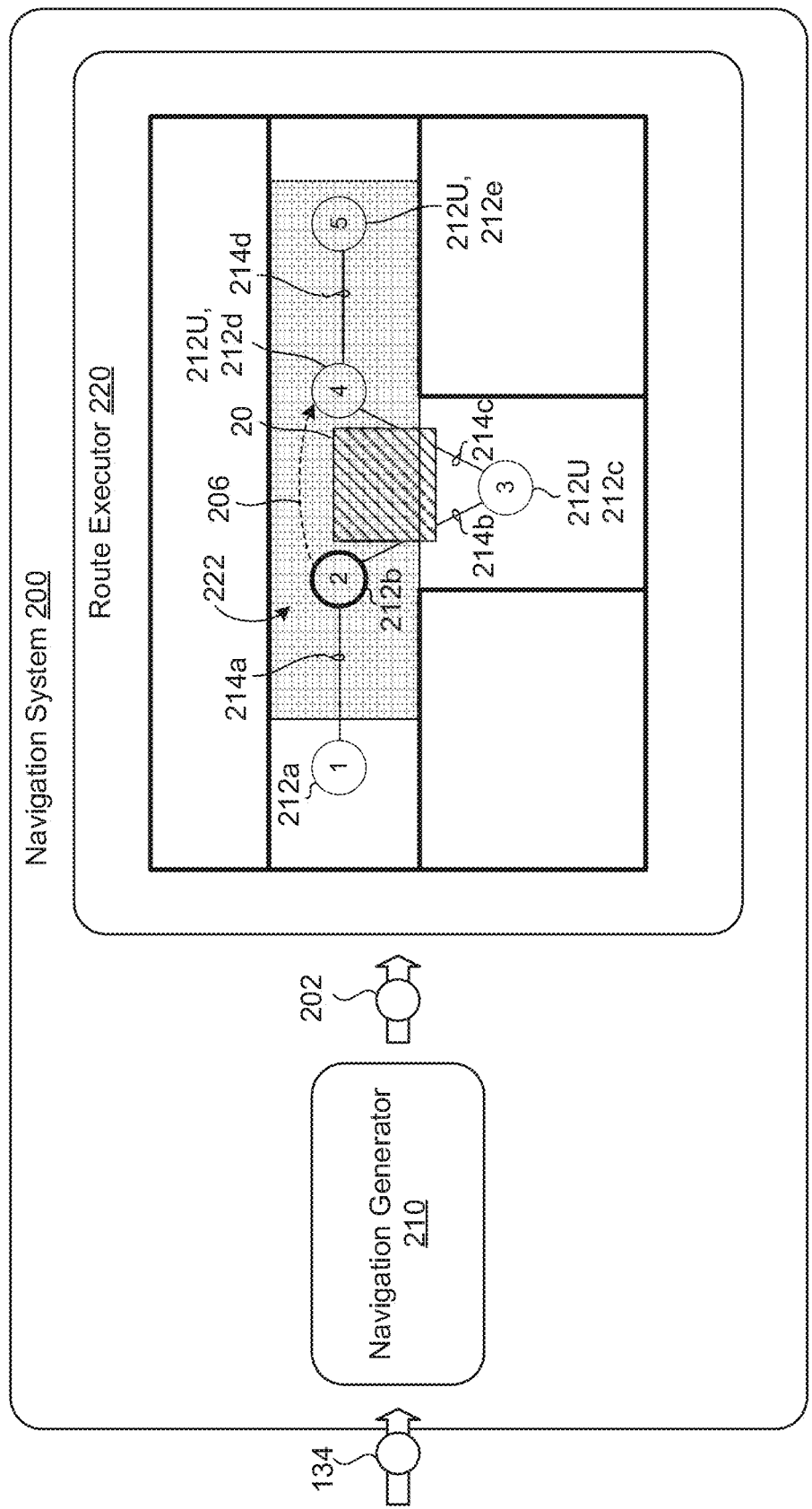
FIG. 2C is a schematic view of a third example of a navigation system for a robot.

In the example of FIG. 2C, the local obstacle map 222 includes multiple untraveled waypoints. Thus, in comparison to the example of FIG. 2B in which the fifth waypoint 212e is not in the bounds of the local obstacle map 222, FIG. 2C depicts an example in which the fifth waypoint 212e is located within the bounds of the local obstacle map 222. In a situation like FIG. 2C where more than one untraveled waypoint 212U is within the bounds of the local obstacle map 222, the executor 220 may be configured to ensure the robot 100 travels to as many of the waypoints 212 of the route 202 as possible. With this criteria, the executor 220 would generate an alternative path 206 to the fourth waypoint 212d instead of the fifth waypoint 212e so that, when the robot 100 continues along the navigation route 202 after traveling along the alternative path 206 to the fourth waypoint 212d, the robot 100 will travel to the fifth waypoint 212e, thus ensuring that the robot 100 travels to the most possible waypoints 212 of the route 202 during its movement path.

Figure 2D:
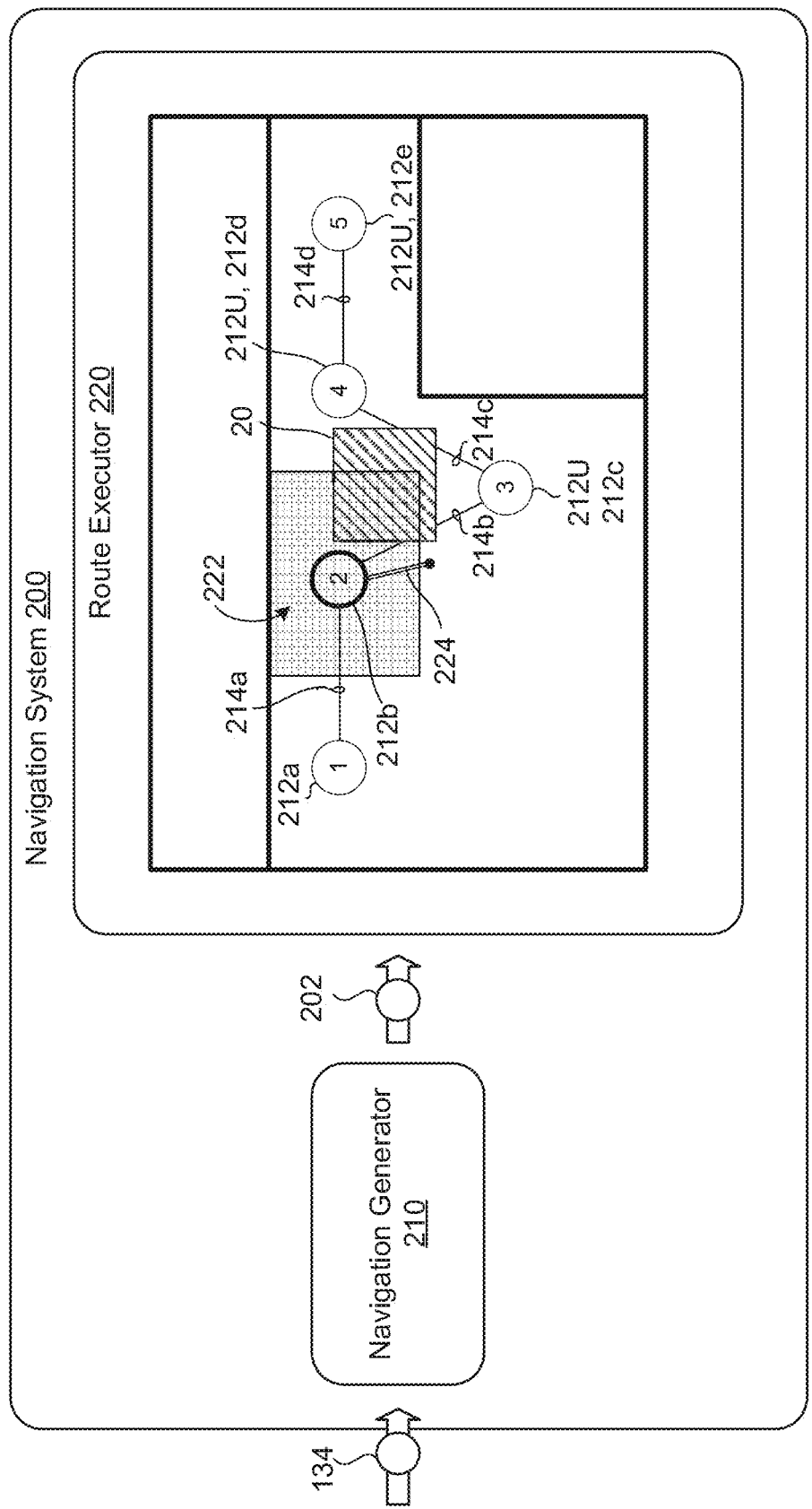
FIG. 2D is a schematic view of a fourth example of a navigation system for a robot.
Figure 2E:
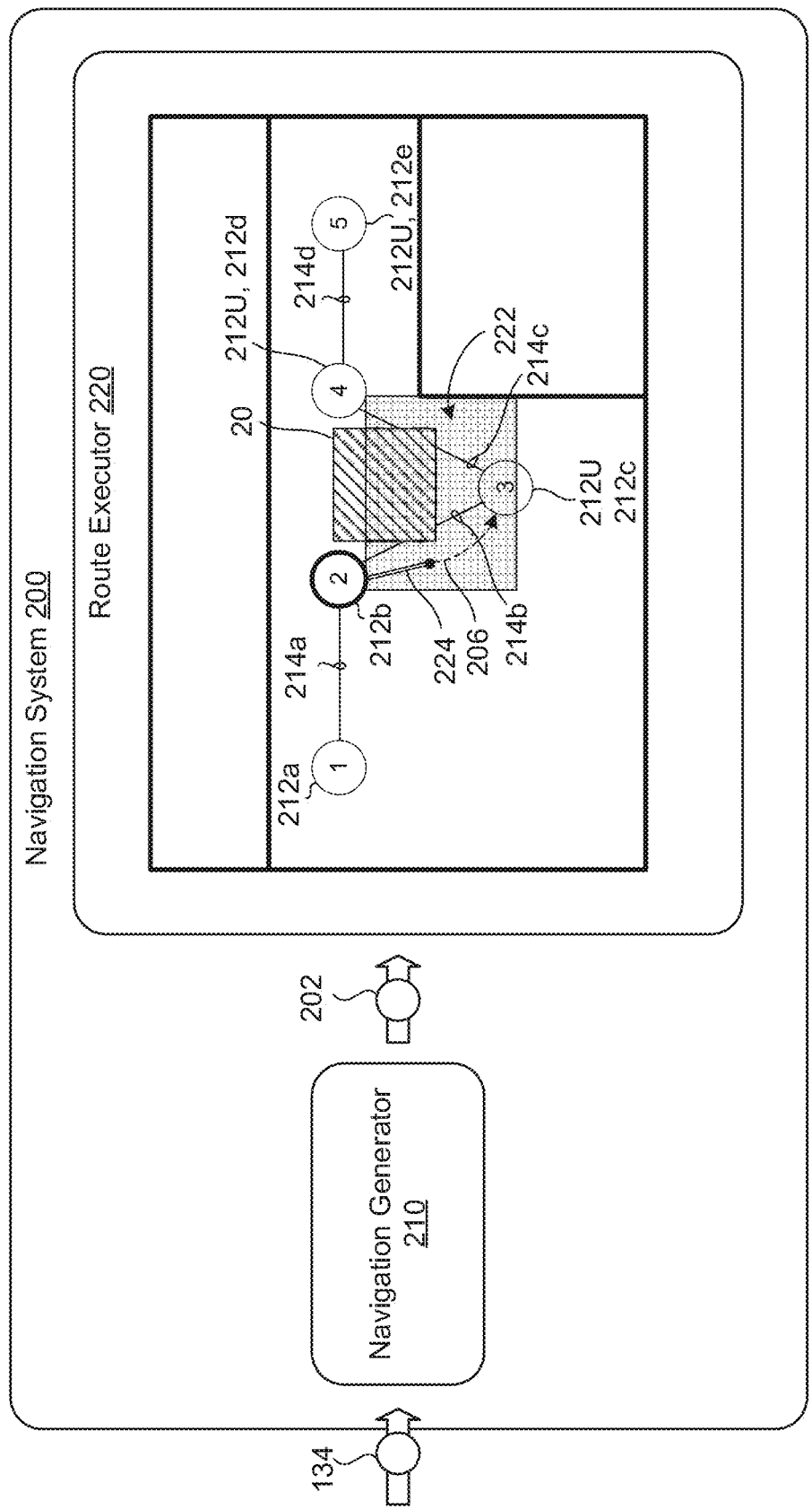
FIG. 2E is a schematic view of a fifth example of a navigation system for a robot.

FIGS. 2D and 2E illustrate a scenario that may occur where there are no untraveled waypoints 212U within the bounds of the local obstacle map 222. In this situation, the executor 220 may be configured to generate an exploration path 224 in a direction toward the next waypoint 212 in the sequence of waypoints 212 for the route 202 that avoids the unforeseeable obstacle 20. In FIG. 2D, the unforeseeable obstacle 20 obstructs the second edge 214b between the second waypoint 212b and the third waypoint 212c. Because the third waypoint 212c is the next untraveled waypoint 212U in the sequence of waypoints 212 for the route 202, the executor 220 generates an exploration path 224 where the exploration path 224 is an obstacle avoidance path towards the third waypoint 212c. In the example of FIGS. 2D and 2E, the robot 100 has open space to explore in the direction indicated by the exploration path 224 until the third waypoint 212c is within the local obstacle map 222.

Thus, as the robot 100 moves along the exploration path 224, the local obstacle map 222 will continue to span its finite area. This means that an untraveled waypoint 212U previously not within the bounds of the local obstacle map 222 may become within the bounds of the local obstacle map 222. In this respect, the robot 100 is exploring along the exploration path 224 until an untraveled waypoint 212U exists within the bounds of the local obstacle map 222.

As shown in the example of FIG. 2E, once an untraveled waypoint 212U exists within the bounds of the local obstacle map 222, the executor 220 is able to generate the alternative path 206 with a destination of the untraveled waypoint 212U. By traveling along an exploration path 224 towards the next waypoint 212 in the sequence of waypoints 212 for the route 202, the executor 220 is configured to minimize the number of waypoints 212 that will not be traveled to by the robot 100 (or maximize the number of waypoints 212 achieved by the robot 100).

Figure 2F:
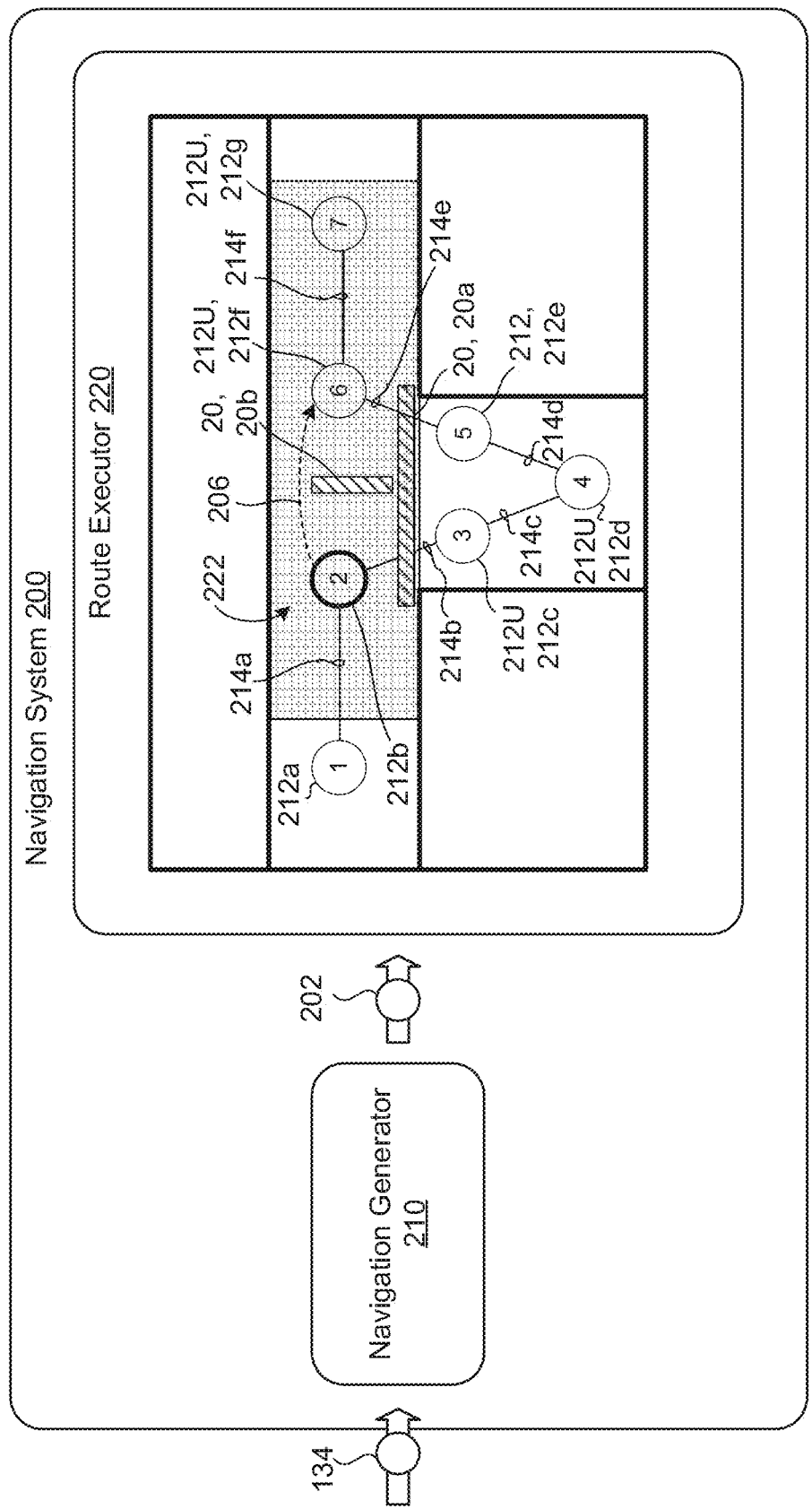
FIG. 2F is a schematic view of a sixth example of a navigation system for a robot.

The example of FIG. 2F is similar to the example of FIG. 2C in that the bounds of the local obstacle map 222 include more than one untraveled waypoint 212U. In the illustrated embodiment, a first unforeseeable obstacle 20, 20a obstructs a second edge 214b and a fifth edge 214e (e.g., completely blocking a room or a corridor). Meanwhile, a second obstacle 20, 20b does not block an edge 214, but forces the alternative path 206 to account for its presence at least partially obstructing the shortest path between the second waypoint 212b and the sixth waypoint 212f. This example also illustrates that the alternative path 206 may result in skipping multiple waypoints 212 (e.g., the third, fourth, and fifth waypoints 212U, 212c-e). Since the executor 220 generates an alternative path 206 from the second waypoint 212b to the untraveled sixth waypoint 212U, 212f, the robot 100 would continue to travel along the route 202 from the sixth waypoint 212f to the seventh waypoint 212g along the sixth edge 214f.

Figure 3:
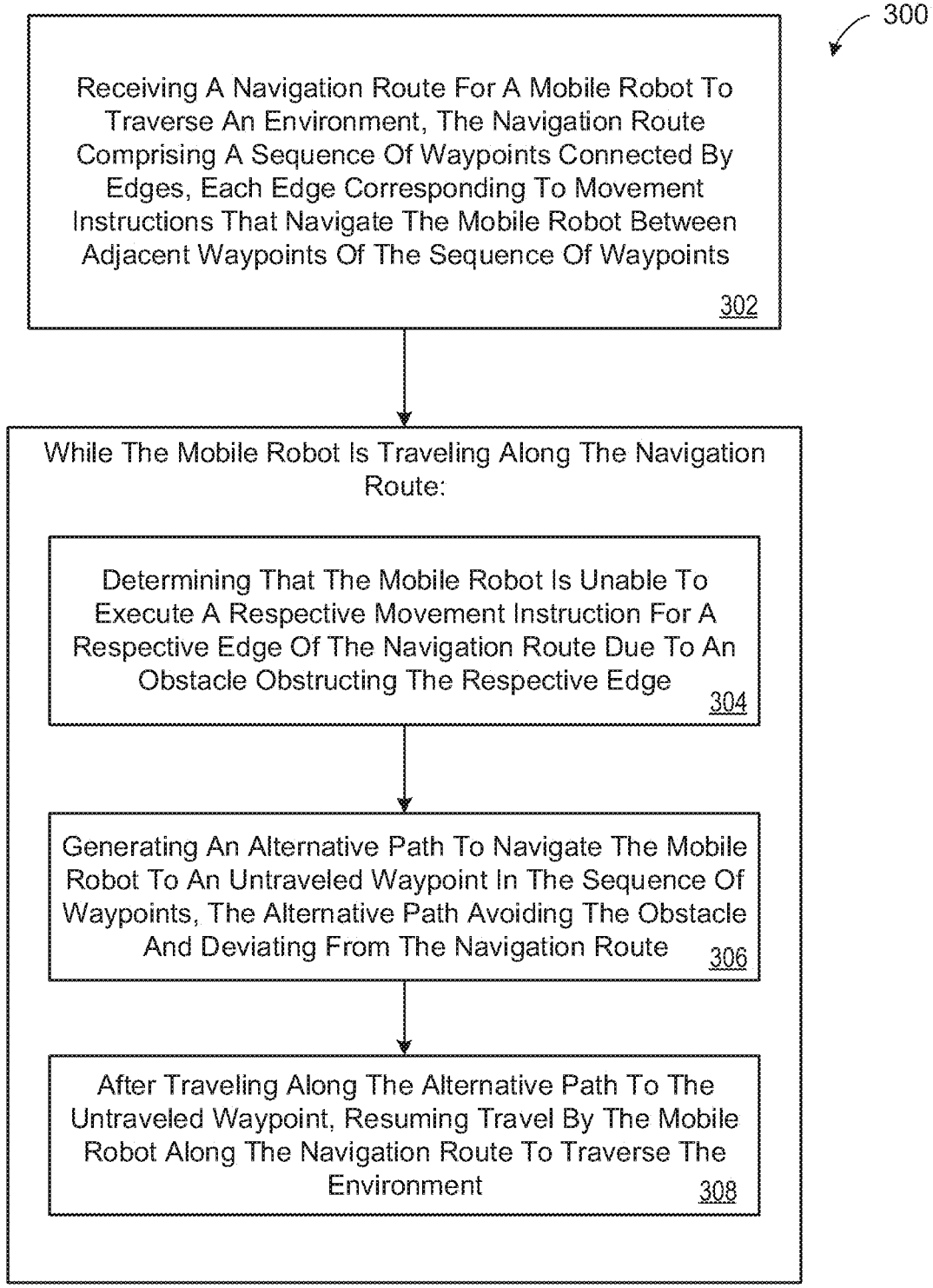
FIG. 3 is a flow chart of an example arrangement of operations for a method of generating an alternative route during navigation of the robot.

FIG. 3 is a flowchart of an example arrangement of operations for a method 300 of generating an alternative path 206 for a navigation route 202. At operation 302, the method 300 receives a navigation route 202 for a mobile robot 100 to traverse an environment 10. The navigation route 202 includes a sequence of waypoints 212 connected by edges 214 where each waypoint is recorded during an initial mapping of the environment 10. Each edge 214 corresponds to movement instructions that navigate the mobile robot 100 between adjacent waypoints 212 of the sequence of waypoints 212. While the mobile robot 100 is traveling along the navigation route 202, operations 304-308 occur. At operation 304, the method 300 determines that the mobile robot 100 is unable to execute a respective movement instruction for a respective edge 214 of the navigation route 202 due to an obstacle 20 previously undiscovered during the initial mapping of the environment 10. At operation 306, the method 300 generates an alternative path 206 to an untraveled waypoint 212U of the sequence of waypoints 212 that avoids the obstacle 20 and deviates from the navigation route 202. After traveling along the alternative path 206 to the untraveled waypoint 212U, at operation 308, the method 300 resumes the navigation route 202 to traverse the environment 10.

Figure 4:
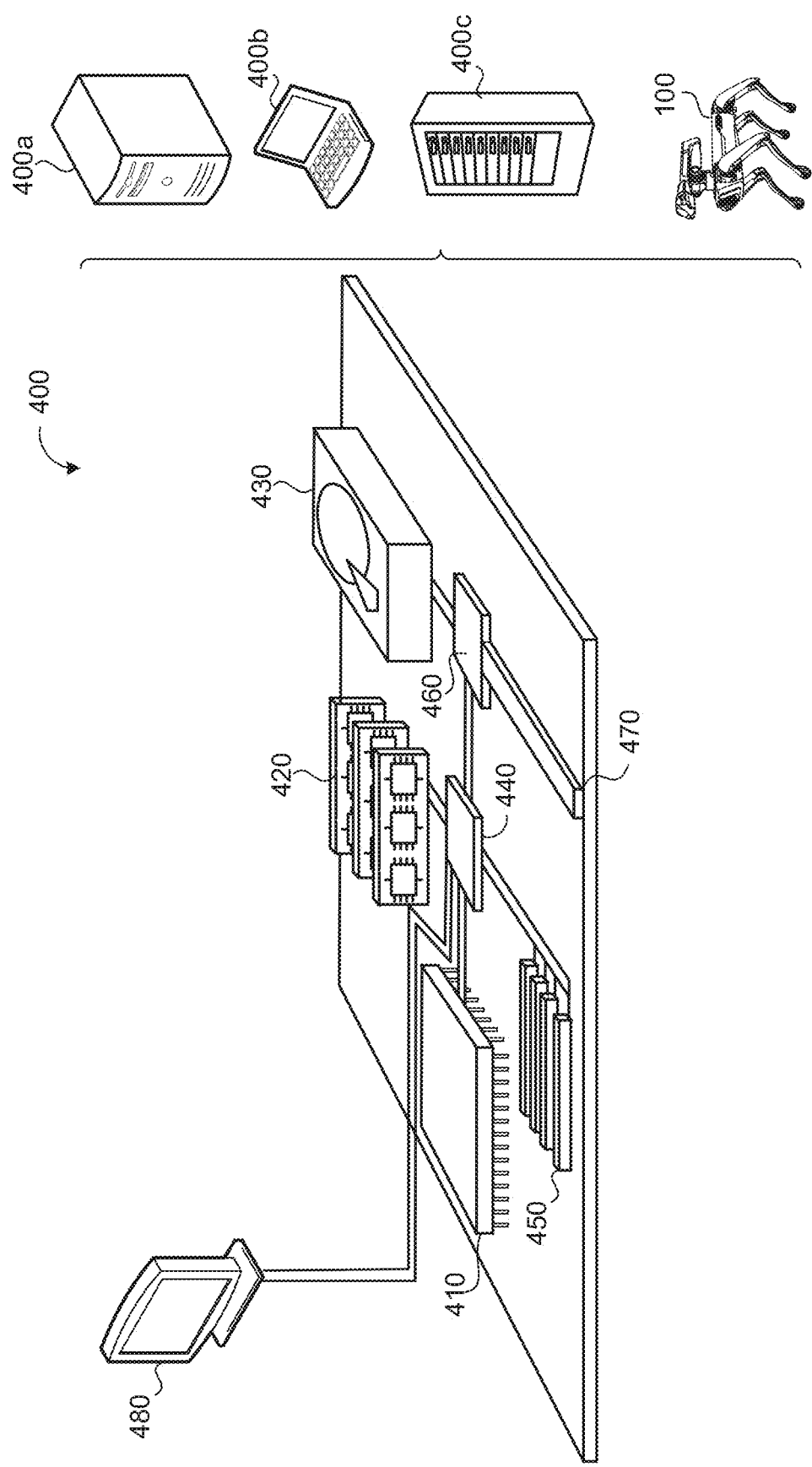
FIG. 4 is a schematic view of an example computing device that may be used to implement the systems and methods described herein.

FIG. 4 is a schematic view of an example computing device 400 that may be used to implement the systems (e.g., the robot 100, the sensor system 130, the computing system 140, the remote system 160, the control system 170, the perception system 180, and/or the navigation system 200) and methods (e.g., the method 300) described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (e.g., data processing hardware 142, 162), memory 420 (e.g., memory hardware 144, 164), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 440, which may accept various expansion cards (not shown). In some implementations, the low-speed controller 460 is coupled to the storage device 430 and a low-speed expansion port 470. The low-speed expansion port 470, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, as part of a rack server system 500c, as part of the robot 100, or as part of the remote control.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user. In certain implementations, interaction is facilitated by a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Furthermore, the elements and acts of the various embodiments described above can be combined to provide further embodiments. Indeed, the methods and systems described herein may be embodied in a variety of other forms; furthermore, various omissions, substitutions and changes in the form of the methods and systems described herein may be made without departing from the spirit of the disclosure. Accordingly, other implementations are within the scope of the following claims.

What is claimed is:

1. A computer-implemented method comprising:
   receiving, by data processing hardware of a legged robot, a navigation route of a topological map for the legged robot, the navigation route comprising a set of waypoints and a first waypoint edge connecting a first waypoint of the set of waypoints and a second waypoint of the set of waypoints;
   identifying, by the data processing hardware, for a foot of the legged robot, a set of footfall placement locations based on the navigation route;
   obtaining, by the data processing hardware, from a sensor of the legged robot, sensor data;
   generating, by the data processing hardware, a local obstacle map based on the sensor data, wherein the local obstacle map is different from the topological map;
   determining, by the data processing hardware, that an action to touch down the foot at a footfall placement location of the set of footfall placement locations is obstructed by an obstacle, wherein the footfall placement location corresponds to the first waypoint edge;
   determining, by the data processing hardware, that the first waypoint edge of the navigation route is obstructed based on determining that the action is obstructed;
   generating, by the data processing hardware, using the local obstacle map, a second waypoint edge connecting a position of the legged robot and a third waypoint based on determining that the first waypoint edge of the navigation route is obstructed, wherein the second waypoint edge generated using the local obstacle map avoids the obstacle and comprises a deviation from the navigation route; and
   instructing, by the data processing hardware, the legged robot to navigate to the third waypoint via the second waypoint edge generated using the local obstacle map and back to the navigation route.

2. The method of claim 1, wherein the local obstacle map comprises an occupancy grid, the occupancy grid comprising a plurality of cells, wherein each cell of the plurality of cells indicates a presence of one or more obstacles.

3. The method of claim 1, further comprising:
   identifying a subset of the set of waypoints are located in the local obstacle map; and
   identifying the third waypoint from the subset of the set of waypoints based on identifying the subset of the set of waypoints are located in the local obstacle map, wherein generating the second waypoint edge is based on identifying the third waypoint.

4. The method of claim 1, wherein the first waypoint edge of the navigation route and the second waypoint edge generated using the local obstacle map are generated using different maps.

5. The method of claim 1, further comprising:
   determining that the third waypoint is outside of a range of the local obstacle map;
   generating a path in a direction towards the third waypoint based on determining that the third waypoint is outside of the range of the local obstacle map;
   instructing the legged robot to navigate along the path to the position of the legged robot; and
   generating an updated local obstacle map based on instructing the legged robot to navigate along the path, wherein generating the second waypoint edge comprises generating the second waypoint edge using the updated local obstacle map.

6. The method of claim 1, wherein instructing the legged robot to navigate to the third waypoint via the second waypoint edge generated using the local obstacle map and back to the navigation route comprises:
   instructing the legged robot to navigate to the third waypoint via the second waypoint edge generated using the local obstacle map; and
   instructing the legged robot to navigate from the third waypoint to a fourth waypoint of the set of waypoints according to the navigation route.

7. The method of claim 1, wherein the topological map represents an environment as a plurality of waypoints interconnected by a plurality of waypoint edges, wherein the topological map indicates a plurality of paths based on the plurality of waypoints and the plurality of waypoint edges, wherein each of the plurality of paths is at least partially obstructed by the obstacle.

8. The method of claim 1, wherein one or more metric details of a map of an environment of the legged robot are removed to obtain the topological map.

9. The method of claim 1, wherein the topological map and the local obstacle map correspond to different portions of an environment of the legged robot.

10. The method of claim 1, further comprising:
    instructing the legged robot to navigate through an environment and generate the topological map, wherein the topological map and the local obstacle map are generated based on different sensor data;
    generating the set of waypoints based on a plurality of features identified by the legged robot; and
    generating the navigation route based on the topological map and the set of waypoints.

11. The method of claim 1, wherein the topological map indicates a first location of the obstacle and the local obstacle map indicates a second location of the obstacle, and wherein determining that the action is obstructed is based on determining the second location of the obstacle.

12. The method of claim 1, wherein a third waypoint edge of the navigation route connects the second waypoint to the third waypoint and a fourth waypoint edge of the navigation route connects the third waypoint to a fourth waypoint, wherein instructing the legged robot to navigate to the third waypoint via the second waypoint edge generated using the local obstacle map and back to the navigation route comprises:
    instructing the legged robot to navigate from the first waypoint to the third waypoint via the second waypoint edge generated using the local obstacle map; and
    instructing the legged robot to navigate from the third waypoint to the fourth waypoint via the fourth waypoint edge of the navigation route.

13. The method of claim 1, wherein the local obstacle map indicates one or more additional obstacles relative to the topological map, wherein the position of the legged robot and the third waypoint are unconnected in the navigation route and the topological map.

14. A legged robot comprising:
two or more legs; and
a navigation system configured to coordinate movement of the legged robot using the two or more legs, the navigation system comprising data processing hardware and memory hardware in communication with the data processing hardware, the memory hardware storing instructions that when executed on the data processing hardware cause the data processing hardware to:
receive a navigation route of a topological map, the navigation route comprising a set of waypoints and a first waypoint edge connecting a first waypoint of the set of waypoints and a second waypoint of the set of waypoints;
identify, for a foot of a leg of the two or more legs, a set of footfall placement locations based on the navigation route;
obtain, from a sensor of the legged robot, sensor data;
generate a local obstacle map based on the sensor data, wherein the local obstacle map is different from the topological map;
determine that an action to touch down the foot at a footfall placement location of the set of footfall placement locations is obstructed by an obstacle, wherein the footfall placement location corresponds to the first waypoint edge;
determine that the first waypoint edge of the navigation route is obstructed based on determining that the action is obstructed;
generate, using the local obstacle map, a second waypoint edge connecting a position of the legged robot and a third waypoint based on determining that the first waypoint edge of the navigation route is obstructed, wherein the second waypoint edge generated using the local obstacle map avoids the obstacle and comprises a deviation from the navigation route; and
instruct the legged robot to navigate to the third waypoint via the second waypoint edge generated using the local obstacle map and back to the navigation route.

15. The legged robot of claim 14, wherein the local obstacle map comprises an occupancy grid, the occupancy grid comprising a plurality of cells, wherein each cell of the plurality of cells indicates a presence of one or more obstacles.

16. The legged robot of claim 14, wherein execution of the instructions on the data processing hardware further causes the data processing hardware to:
identify a subset of the set of waypoints are located in the local obstacle map; and
identify the third waypoint from the subset of the set of waypoints based on identifying the subset of the set of waypoints are located in the local obstacle map, wherein generating the second waypoint edge is based on identifying the third waypoint.

17. The legged robot of claim 14, wherein the first waypoint edge of the navigation route and the second waypoint edge generated using the local obstacle map are generated using different maps.

18. The legged robot of claim 14, wherein execution of the instructions on the data processing hardware further causes the data processing hardware to:
determine that the third waypoint is outside of a range of the local obstacle map;
generate a path in a direction towards the third waypoint based on determining that the third waypoint is outside of the range of the local obstacle map;
instruct the legged robot to navigate along the path to the position of the legged robot; and
generate an updated local obstacle map based on instructing the legged robot to navigate along the path, wherein to generate the second waypoint edge, the execution of the instructions on the data processing hardware further causes the data processing hardware to generate the second waypoint edge using the updated local obstacle map.

19. The legged robot of claim 14, wherein to instruct the legged robot to navigate to the third waypoint via the second waypoint edge generated using the local obstacle map and back to the navigation route, execution of the instructions on the data processing hardware further causes the data processing hardware to:
instruct the legged robot to navigate to the third waypoint via the second waypoint edge generated using the local obstacle map; and
instruct the legged robot to navigate from the third waypoint to a fourth waypoint of the set of waypoints according to the navigation route.

20. The legged robot of claim 14, wherein the topological map represents an environment as a plurality of waypoints interconnected by a plurality of waypoint edges, wherein the topological map indicates a plurality of paths based on the plurality of waypoints and the plurality of waypoint edges, wherein each of the plurality of paths is at least partially obstructed by the obstacle.

21. The legged robot of claim 14, wherein one or more metric details of a map of an environment of the legged robot are removed to obtain the topological map.

22. The legged robot of claim 14, wherein the topological map and the local obstacle map correspond to different portions of an environment of the legged robot.

23. The legged robot of claim 14, wherein execution of the instructions on the data processing hardware further causes the data processing hardware to:
instruct the legged robot to navigate through an environment and generate the topological map, wherein the topological map and the local obstacle map are generated based on different sensor data;
generate the set of waypoints based on a plurality of features identified by the legged robot; and
generate the navigation route based on the topological map and the set of waypoints.

24. The legged robot of claim 14, wherein the topological map indicates a first location of the obstacle and the local obstacle map indicates a second location of the obstacle, and wherein to determine that the action is obstructed, execution of the instructions on the data processing hardware further causes the data processing hardware to:
determine that the action is obstructed based on determining the second location of the obstacle.

25. The legged robot of claim 14, wherein a third waypoint edge of the navigation route connects the second waypoint to the third waypoint and a fourth waypoint edge of the navigation route connects the third waypoint to a fourth waypoint, wherein to instruct the legged robot to navigate to the third waypoint via the second waypoint edge generated using the local obstacle map and back to the navigation route, execution of the instructions on the data processing hardware further causes the data processing hardware to:
- instruct the legged robot to navigate from the first waypoint to the third waypoint via the second waypoint edge generated using the local obstacle map; and
- instruct the legged robot to navigate from the third waypoint to the fourth waypoint via the fourth waypoint edge of the navigation route.

26. The legged robot of claim 14, wherein the local obstacle map indicates one or more additional obstacles relative to the topological map, wherein the position of the legged robot and the third waypoint are unconnected in the navigation route and the topological map.

\* \* \* \* \*